US007096494B1

(12) United States Patent  Chen

(10) Patent No.: US 7,096,494 B1
(45) Date of Patent: Aug. 22, 2006

(54) CRYPTOGRAPHIC SYSTEM AND METHOD FOR ELECTRONIC TRANSACTIONS

(76) Inventor: Jay C. Chen, 1355 Blackstone Rd., San Marino, CA (US) 91108

( * ) Notice: Subject to any disclaimer, the term of this patent is extended or adjusted under 35 U.S.C. 154(b) by 0 days.

(21) Appl. No.: 09/456,794

(22) Filed: Dec. 8, 1999

Related U.S. Application Data

(60) Provisional application No. 60/084,257, filed on May 5, 1998.

(30) Foreign Application Priority Data

May 5, 1999 (WO) ............... PCT/US99/09938

(51) Int. Cl.
*H04L 9/32* (2006.01)
(52) U.S. Cl. ............... 726/9; 380/259; 380/278; 380/282; 713/156; 713/170; 713/171; 705/65; 705/66; 705/67; 705/41
(58) Field of Classification Search .......... 380/278, 380/282, 259, 273; 713/153, 156, 170, 171; 726/9; 705/65, 67, 66, 41
See application file for complete search history.

(56) References Cited

U.S. PATENT DOCUMENTS

| 4,746,788 A | * | 5/1988 | Kawana ............ 235/380 |
| 4,755,940 A | * | 7/1988 | Brachtl et al. ....... 705/44 |
| 4,771,461 A | * | 9/1988 | Matyas ............. 380/282 |

(Continued)

FOREIGN PATENT DOCUMENTS

EP    0 588 339 A2    3/1994

(Continued)

OTHER PUBLICATIONS

Schneier, Bruce, Applied Cryptography, John Wiley & Sons, Inc. 2$^{nd}$ ed., pp. 43, 47, 50, 55, 56, 56, 63, 64, 518, 519, 576, and 577.*

(Continued)

*Primary Examiner*—Emmanuel L. Moise
*Assistant Examiner*—Paul Callahan
(74) *Attorney, Agent, or Firm*—Craig Gelfound; McDermott Will & Emery, LLP

(57) ABSTRACT

An electronic transaction system, which facilitates secure electronic transactions among multiple parties including cardholders, merchants, and service providers (SP). The system involves electronic cards, commonly known as smart cards, and their equivalent computer software package. The card mimics a real wallet and contains commonly seen financial or non-financial instruments such as a credit card, checkbook, or driver license. A transaction is protected by a hybrid key cryptographic system and is normally carried out on a public network such as the Internet. Digital signatures and challenges-responses are used to ensure integrity and authenticity. The card utilizes secret keys such as session keys assigned by service providers (SPs) to ensure privacy for each transaction. The SP is solely responsible for validating each participant's sensitive information and assigning session keys. The system does not seek to establish a trust relationship between two participants of a transaction. The only trust relationship needed in a transaction is the one that exists between individual participants and the SP. The trust relationship with a participant is established when the SP has received and validated certain established account information from that particular participant. To start a transaction with a selected SP, a participant must have the public key of the intended SP. Since the public key is openly available, its availability can be easily established by the cardholder. The SP also acts as a gateway for the participants when a transaction involves interaction with external systems.

35 Claims, 29 Drawing Sheets

U.S. PATENT DOCUMENTS

| | | | |
|---|---|---|---|
| 5,288,978 A * | 2/1994 | Iijima | 235/380 |
| 5,521,362 A | 5/1996 | Powers | |
| 5,530,232 A | 6/1996 | Taylor | |
| 5,534,857 A * | 7/1996 | Laing et al. | 340/5.74 |
| 5,544,246 A | 8/1996 | Mandelbaum et al. | 380/23 |
| 5,590,197 A * | 12/1996 | Chen et al. | 705/65 |
| 5,671,279 A | 9/1997 | Elgamal | 380/23 |
| 5,784,463 A * | 7/1998 | Chen et al. | 713/171 |
| 5,790,677 A | 8/1998 | Fox et al. | |
| 5,796,840 A | 8/1998 | Davis | |
| 6,240,091 B1 * | 5/2001 | Ginzboorg et al. | 370/401 |
| 6,240,513 B1 * | 5/2001 | Friedman et al. | 713/152 |
| 6,263,438 B1 * | 7/2001 | Walker et al. | 713/178 |
| 6,282,552 B1 * | 8/2001 | Thompson et al. | 707/505 |
| 6,367,019 B1 * | 4/2002 | Ansell et al. | 726/26 |

FOREIGN PATENT DOCUMENTS

| | | |
|---|---|---|
| EP | 0 588 339 A3 | 5/1995 |
| EP | 0 807 911 A2 | 11/1997 |
| JP | 7-0152837 A | 6/1995 |
| JP | 9-223210 A | 8/1997 |

OTHER PUBLICATIONS

Schneier, Bruce, Applied Cryptography 1996, John Wiley & Sons, Inc., $2^{nd}$ ed., p. 518.*

Bruce Schneier, Applied Cryptography $2^{nd}$ Edition, Wiley & Sons Pub., Oct. 1995, pp. 51, 59, 60, 63, 64, 518.*

Schneier, Bruce, "Basic Protocol," Applied Cryptography $2^{nd}$ edition, 1996, pp. 42-43, 51-54.

International Search Report, dated Sep. 9, 1999.

* cited by examiner

| NAME | KEY TYPE | KEY VALUE | ACCOUNT INFORMATION (Number, expiration date, etc.) | CARD TYPE | PIN (optional) | Miscellan-eous Data |
|---|---|---|---|---|---|---|
| | | | | CREDIT CARD | | |
| | | | | DEBIT CARD | | |
| | | | | ATM CARD | | |
| | | | | MEMBER CARD | | |
| | | | | LOYALTY CARD | | |
| | | | | etc. | | |
| | | | | | | |
| | | | | | | |
| | | | | | | |
| | | | | | | |

SERVICE PROVIDERS' DATA AREA (SPDA)

702  704  706  708  710  712  714

700

ELECTRONIC CARD
20

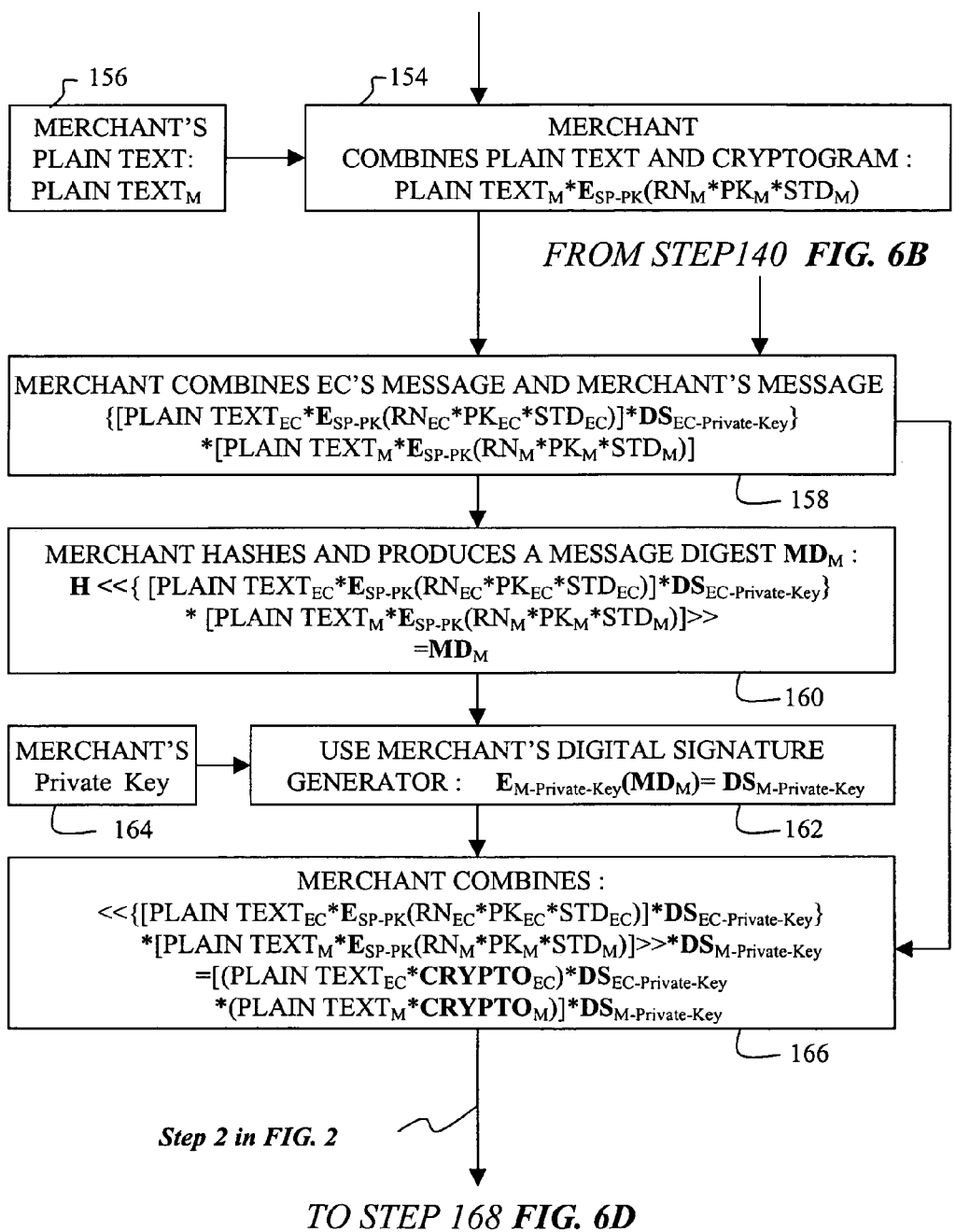

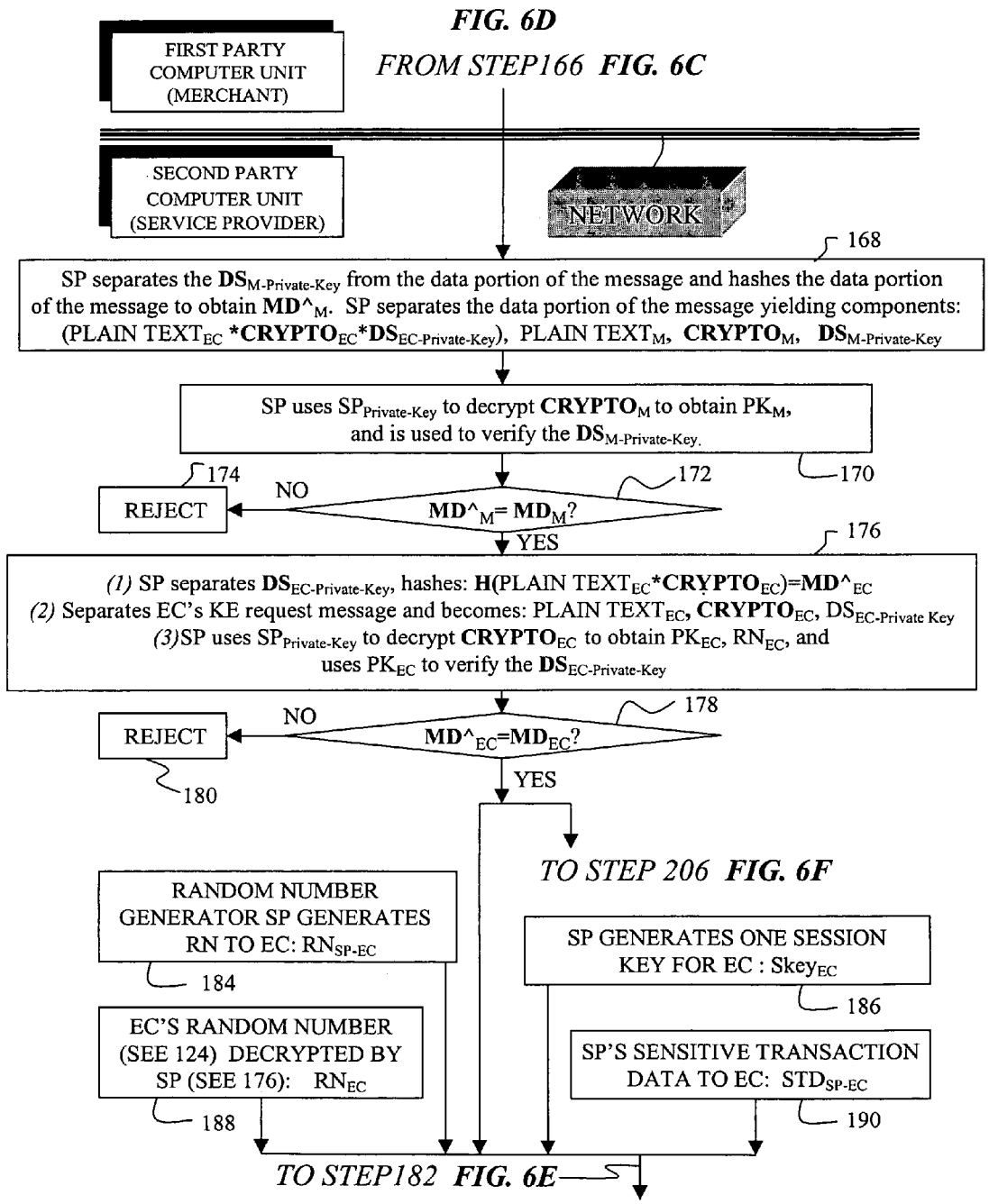

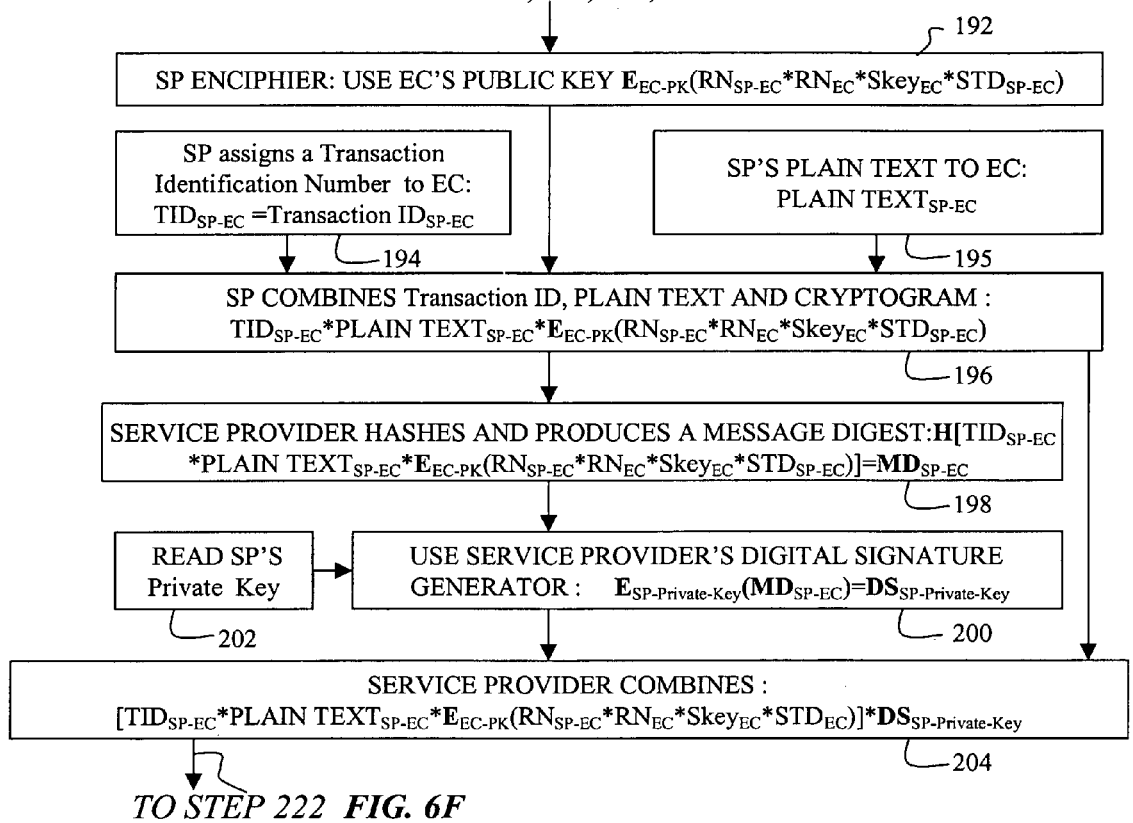
FIG. 6E
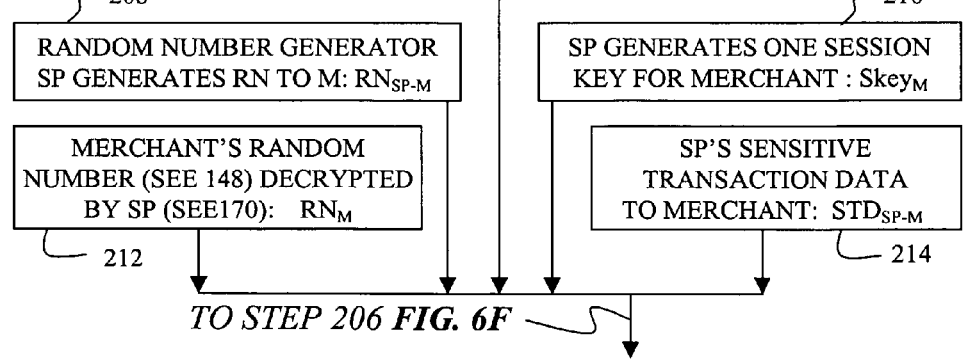

FIG. 6H

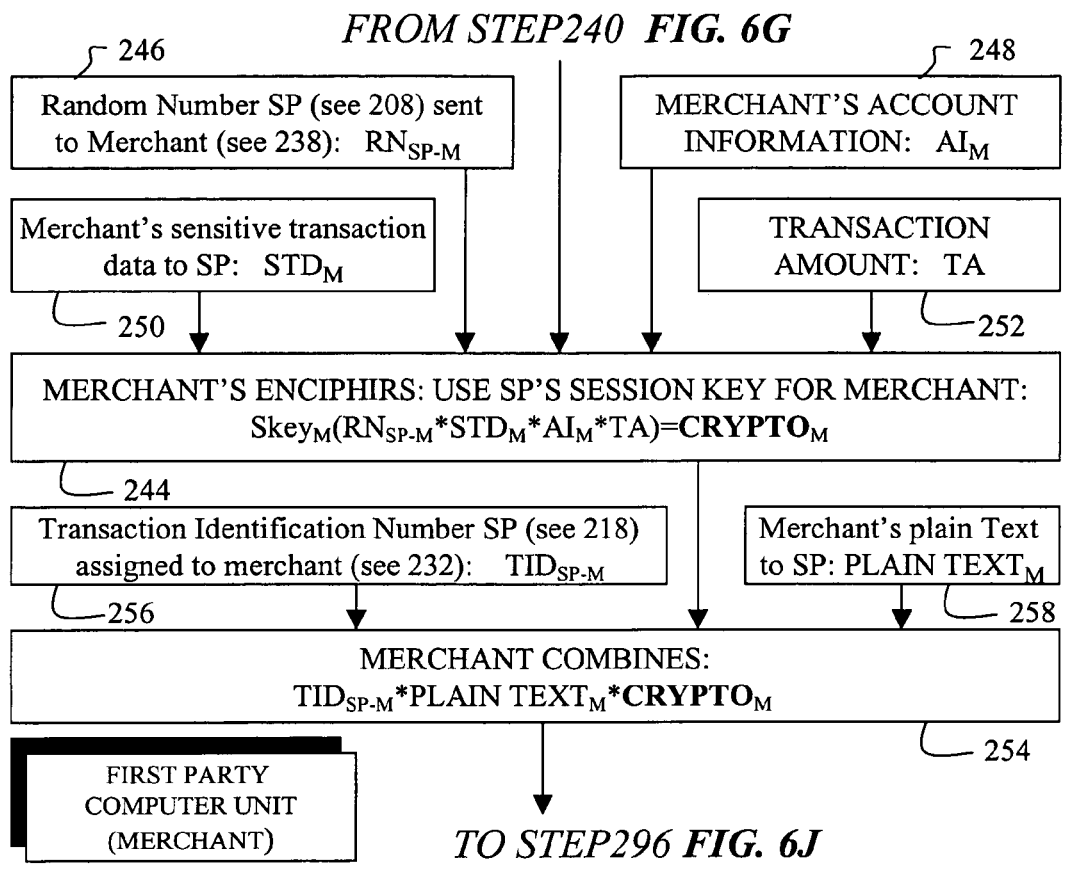

FROM STEP240 FIG. 6G

246 — Random Number SP (see 208) sent to Merchant (see 238): $RN_{SP-M}$

248 — MERCHANT'S ACCOUNT INFORMATION: $AI_M$

250 — Merchant's sensitive transaction data to SP: $STD_M$

252 — TRANSACTION AMOUNT: TA

244 — MERCHANT'S ENCIPHIRS: USE SP'S SESSION KEY FOR MERCHANT:
$Skey_M(RN_{SP-M}*STD_M*AI_M*TA) = CRYPTO_M$

256 — Transaction Identification Number SP (see 218) assigned to merchant (see 232): $TID_{SP-M}$

258 — Merchant's plain Text to SP: PLAIN $TEXT_M$

254 — MERCHANT COMBINES:
$TID_{SP-M}*PLAIN\ TEXT_M*CRYPTO_M$

FIRST PARTY COMPUTER UNIT (MERCHANT)

TO STEP296 FIG. 6J

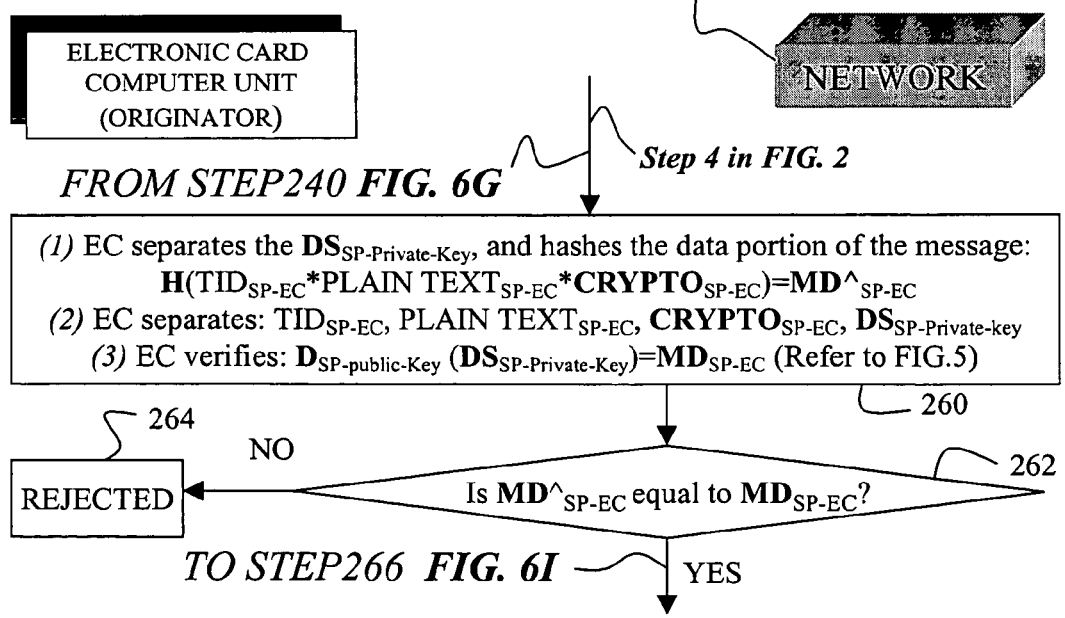

ELECTRONIC CARD COMPUTER UNIT (ORIGINATOR)

FROM STEP240 FIG. 6G

Step 4 in FIG. 2

260 —
(1) EC separates the $DS_{SP-Private-Key}$, and hashes the data portion of the message:
$H(TID_{SP-EC}*PLAIN\ TEXT_{SP-EC}*CRYPTO_{SP-EC}) = MD\char94_{SP-EC}$
(2) EC separates: $TID_{SP-EC}$, PLAIN $TEXT_{SP-EC}$, $CRYPTO_{SP-EC}$, $DS_{SP-Private-key}$
(3) EC verifies: $D_{SP-public-Key}(DS_{SP-Private-Key}) = MD_{SP-EC}$ (Refer to FIG.5)

262 — Is $MD\char94_{SP-EC}$ equal to $MD_{SP-EC}$?

264 — NO → REJECTED

YES → TO STEP266 FIG. 6I

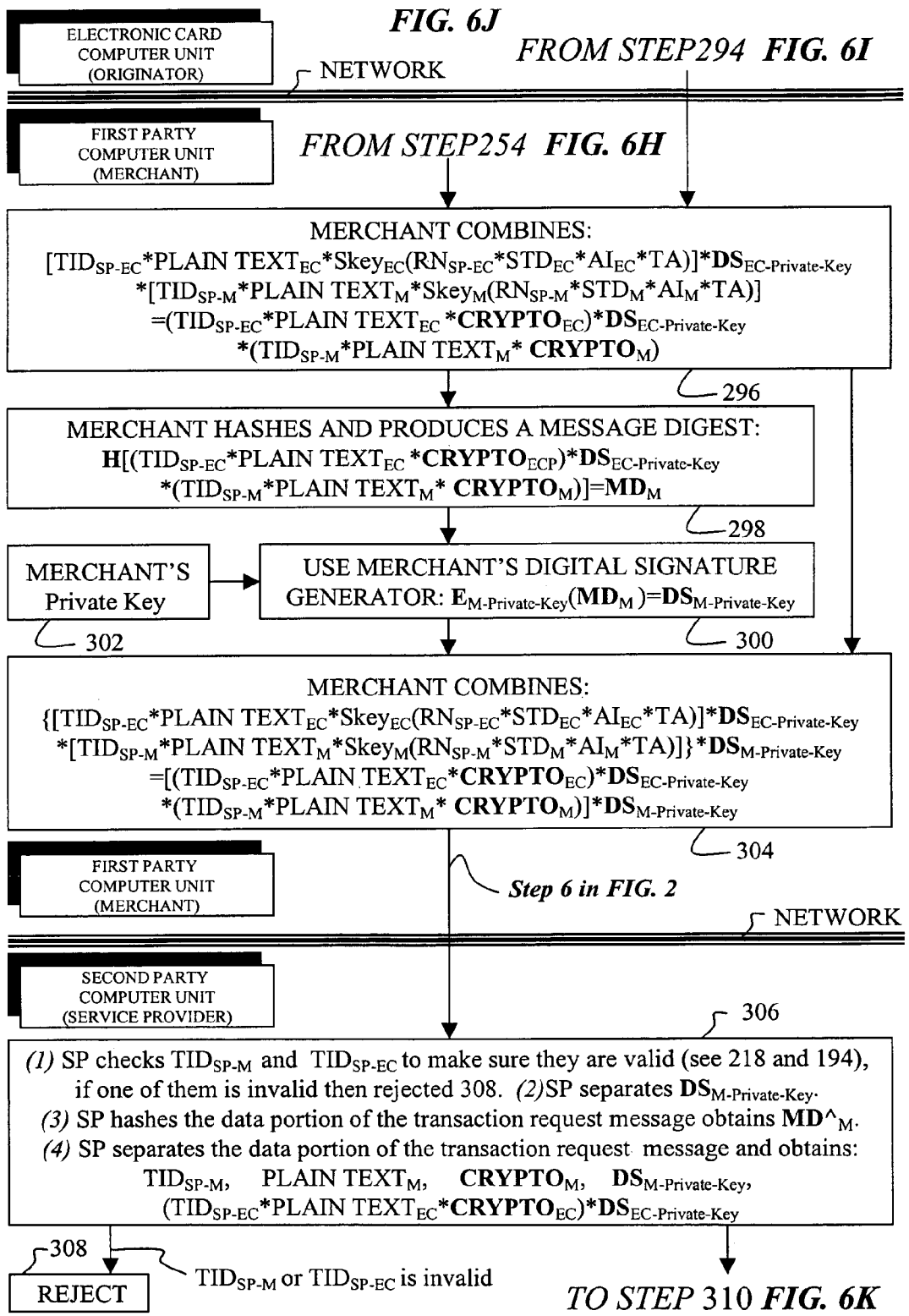

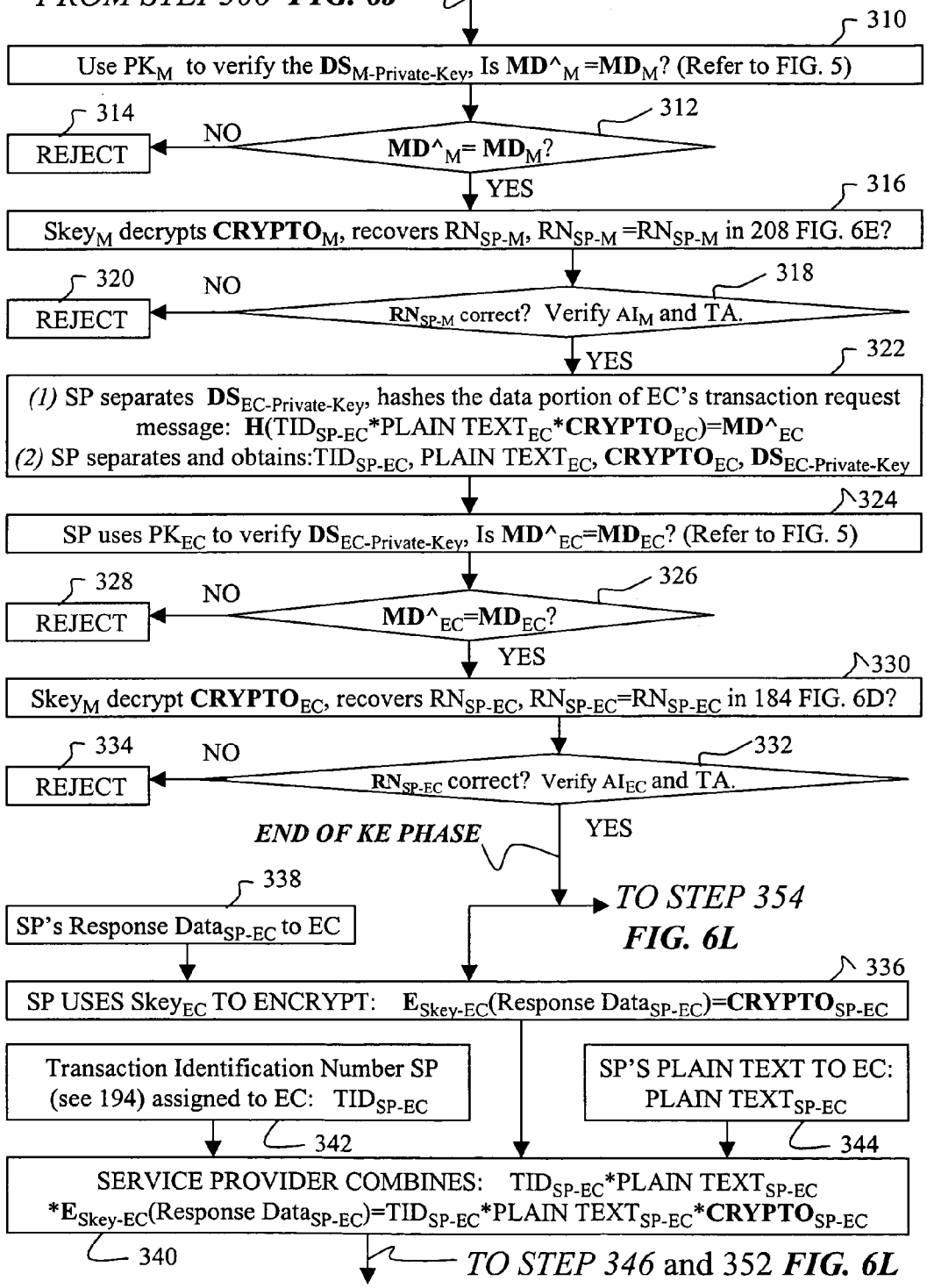

FIG. 6L
FROM STEP 340 FIG. 6K
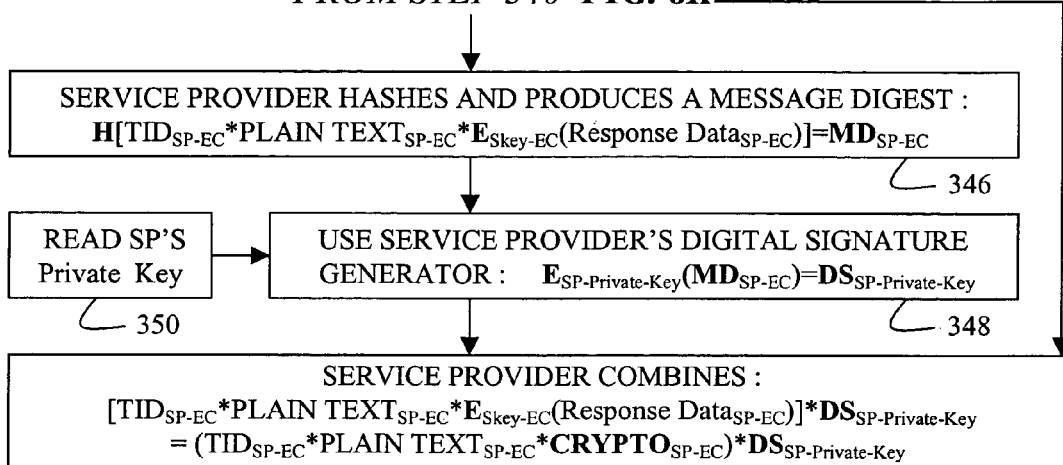
FROM STEP 332 FIG. 6K
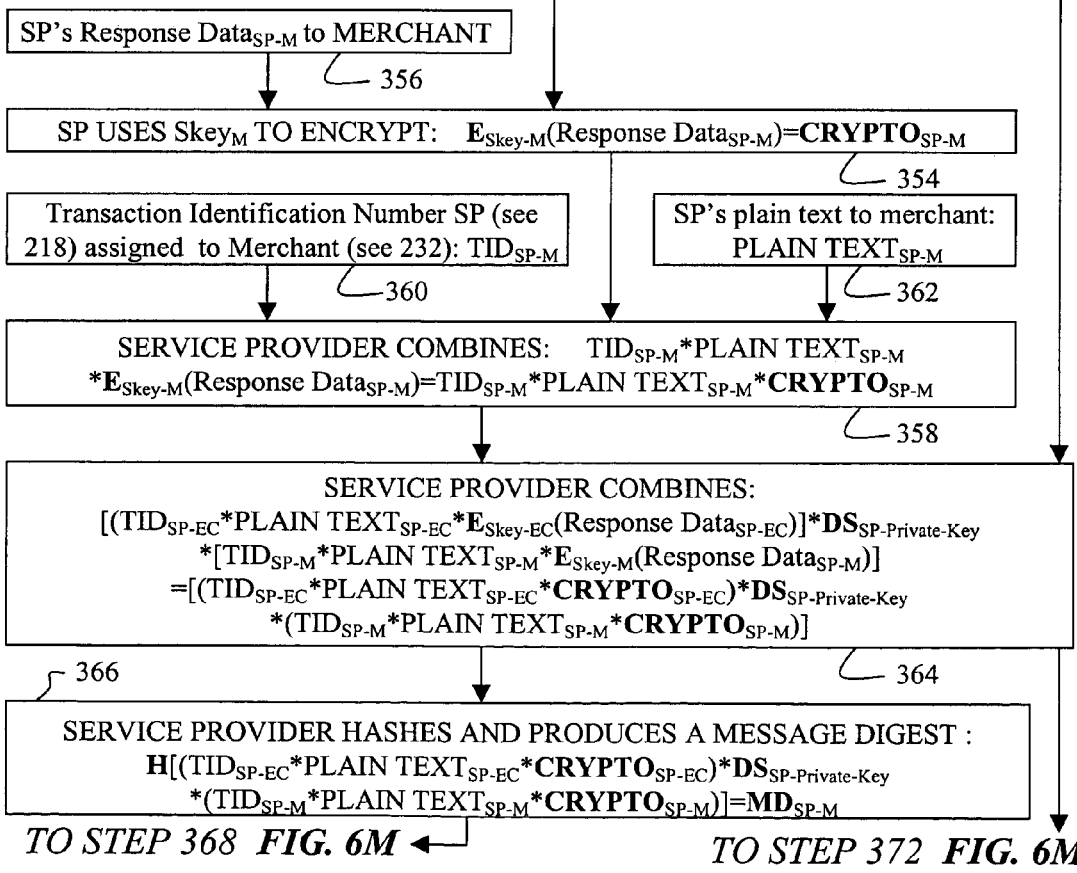
TO STEP 368 FIG. 6M     TO STEP 372 FIG. 6M

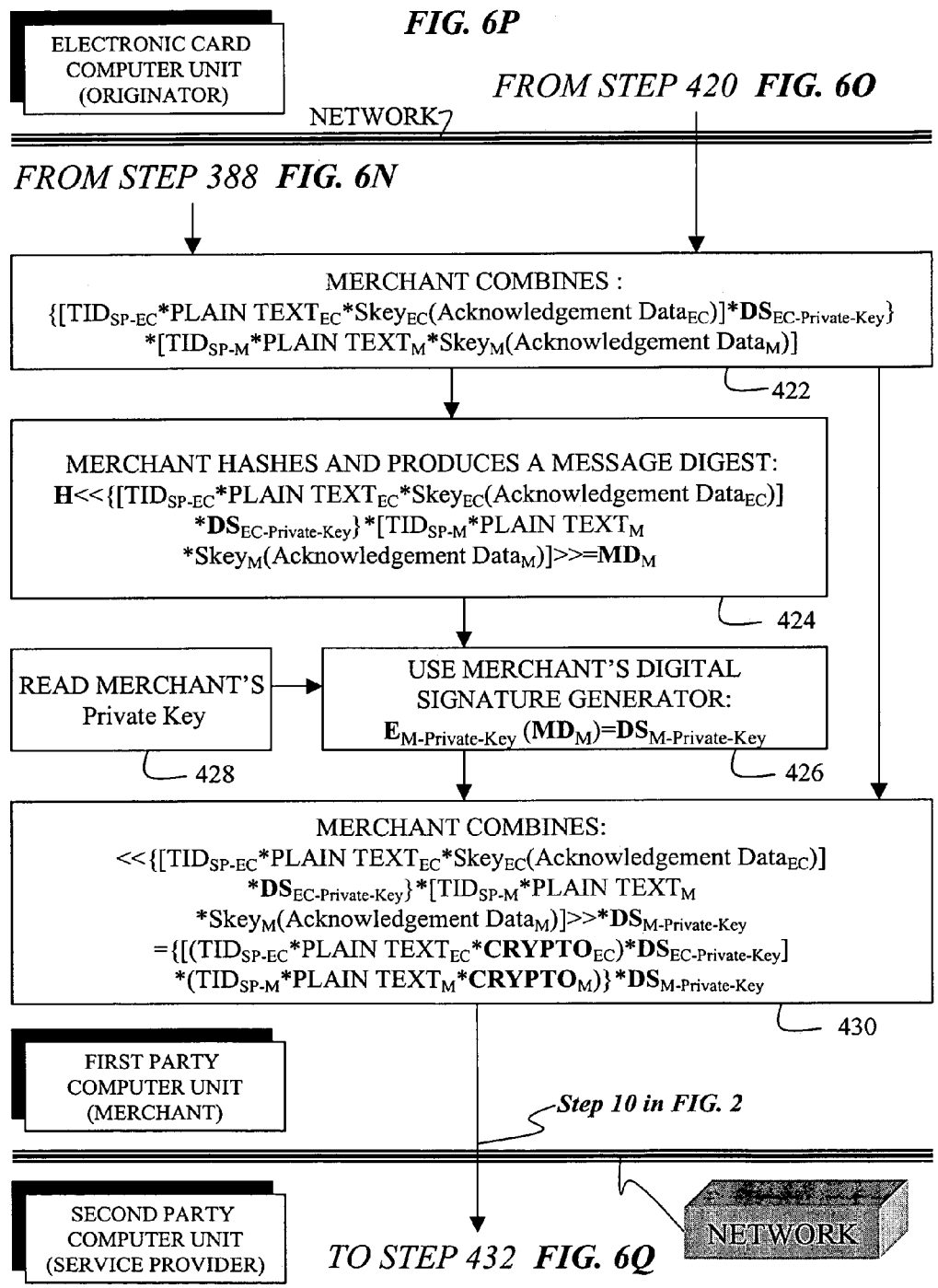

CRYPTOGRAPHIC SYSTEM AND METHOD FOR ELECTRONIC TRANSACTIONS

CROSS-REFRENCE TO RELATED APPLICATIONS

The present application claims priority of PCT Application Entitled A CRYPTOGRAPHIC SYSTEM AND METHOD FOR ELECTRONIC TRANSACTIONS, International Application No. PCT/US99/09938, filed May 5, 1999, which claims priority of U.S. Provisional Application No. 60/084,257 filed on May 5, 1998.

FIELD OF THE INVENTION

The present invention relates generally to a cryptographic system and method for secure electronic transactions, and more particularly to an electronic card, which takes the form of a "smart card" and/or its equivalent software.

BACKGROUND OF THE INVENTION

The generic term, "smart card," generally denotes an integrated circuit (IC) card, that is, a credit-card-size piece of plastic with an embedded microchip. The IC chip on a smart card generally, but not necessarily, consists of a microprocessor (the CPU), read-only memory (ROM), random access memory (RAM), an input/output unit, and some persistent memory such as electrically erasable programmable read-only memory (EEPROM). The chip can perform arithmetic computations, logic processing, data management, and data communication.

Smart cards are mainly of two types: contact and contactless. The International Standard Organization (ISO) has established specifications for such electronic cards under the ISO series. In particular, ISO 7816 applies to integrated circuit(s) cards. Because of its computing capability, a smart card can support a multitude of security features such as authentication, secured read/write, symmetric key and asymmetric key encryption/decryption. These smart card security features make it well suited for electronic commerce where data security and authenticity are of primary importance.

Smart card use has found application in many specialized fields such as mass transportation, health insurance, parking, campus, gas, etc. And its potential use in electronic commerce and other financial areas are gaining popularity at a rapid pace. U.S. Pat. No. 5,521,362, issued to Robert S. Power on May 28, 1996, entitled "Electronic purse card having multiple storage memories to prevent fraudulent usage and method therefore," describes an electronic purse application. Power's invention demonstrates a smart card's capability to be used as a secure financial instrument and not just as a storage device.

As advances in technology push smart-card chip computing to higher speeds and larger memory capacity, the concept of a "multi-application" smart card is increasingly becoming economically and physically feasible. U.S. Pat. No. 5,530,232 issued to Douglas C. Taylor on Jun. 25, 1996, entitled "Multi-application data card," describes a multi-application card, which is capable of substituting for a plurality of existing single-application cards and satisfying both financial and non-financial requirements. The multi-application card uses a conventional data link to connect between the smart card and the remote service provider. Taylor's invention, the multi-application card, does not relate to any kind of open network or cryptographic method.

U.S. Pat. No. 5,544,246 issued to Mandelhaum et al. on" on Aug. 5, 1996, entitled "Smart card adapted for a plurality of service providers and for remote installation of same," describes a smart card, which allows different service providers to coexist on the same smart card. Each service provider is considered a user of the smart card and is installed on the card by the issuer/owner of the smart card. Each user is allowed to build a tree-like file structure and protect it with a password file. Mandelbaum's invention depicts a smart card allows for the creation and deletion of multiple applications. Mandelbaum's smart card controls the access to each application by using an appropriate password file.

U.S. Pat. No. 5,671,279 issued to Taher Elgamal on Sep. 23, 1997, entitled "Electronic commerce using a secure courier system," describes a system for implementing electronic commerce over a public network using public/private key cryptography. The Elgamal patent did not mention the use of a smart card as a tool in conducting the electronic commerce and the participants were authenticated through the use of digital certificates. The secure courier system requires a secured channel such as a Secure Socket Layer (SSL) between the trading parties over an open network such as the Internet.

U.S. Pat. No. 5,790,677, issued to Fox et al. on Aug. 4, 1998, entitled "System and method for secure electronic commerce transactions," describes a system and method having a registration process followed by a transaction process. During the registration phase, each participant of a transaction registers with a trusted credential-binding server by sending to the server a registration packet. The server produces unique credentials based upon the request received and sends them to the request originator. During the transaction phase, the originator of the transaction requests, receives and verifies the credentials of all intended recipients of the commerce document and/or instrument and encrypts the document and/or instrument using the public key of the individual recipient. Thus, each receiving party can decrypt and access the information intended only for him. Fox's patent describes a process which reflects the theme of the so called "Secure Electronic Transaction" (SET) standard which is an ongoing effort supported by several major financial and software companies to establish a digital certificate and certificate authority based electronic commerce system.

U.S. Pat. No. 5,796,840 issued to Derek L. Davis on Aug. 18, 1998, entitled "Apparatus and method for providing secured communication," describes a semiconductor device, which is capable of generating device-specific key pairs to be used in subsequent message authentication and data communication. The semiconductor device uses public/private key cryptography to ensure the authenticity of two communicating parties.

U.S. Pat. No. 5,534,857 issued to Simon G. Laing and Matthew P. Bowcock on Jul. 9, 1996, entitled "Method and System for Secure, Decentralized Personalization of Smart Cards," describes a method and apparatus for securely writing confidential data from an issuer to a customer smart card at a remote location. A mutual session key for enciphering data transfer between a secure terminal and a secure computer is generated by using a common key stored in the secure computer and a retailer smart card.

It is clear from the inventions mentioned above that the architecture of a secure electronic commerce system involves a public key infrastructure and digital certificate authority associated with it.

On an open network, a secret key-based system is less flexible in terms of key distribution and key management, and is more subject to malicious attack. On the other hand, a public/private key-based system, with all its advantages over the secret key system, has its own daunting task of authenticating transaction parties to one another. The current invention presents another system and method, which replaces the need for certificate authorities and digital certificates. The current invention is a hybrid system for electronic transactions. The hybrid system uses public/private keys during the key exchange phase and uses a session key as a secret key during the transaction phase.

SUMMARY OF THE INVENTION

In one aspect of the present invention, a method of conducting an electronic transaction using an electronic card having a public key of a service provider, includes initiating a transaction at a cardholder location by encrypting at least a portion of a message with the service provider's public key from the electronic card and sending the message to a service provider location, and completing the transaction between the cardholder and the service provider in response to the message.

In another aspect of the present invention, a method of conducting an electronic transaction using an electronic card having a public key of a service provider includes formatting a key exchange request message at a member, at least a portion of the key exchange request message being encrypted using the service provider's public key from the electronic card, sending the key exchange request message from the member to the service provider, generating a session key at the service provider in response to the key exchange request message, formatting a key exchange response message including the session key at the service provider, sending the key exchange response message from the service provider to the member, and using the session key to complete the transaction.

In yet another aspect of the present invention, a method of conducting an electronic transaction using an electronic card having a public key of a service provider includes generating a member challenge by the member, encrypting by the member the member challenge using the service provider's public key from the electronic card to generate a first cryptogram, formatting by the member a key exchange request message including the first cryptogram and a public key of the member, signing digitally by the member the key exchange request message, sending the digitally signed key exchange request message to the service provider, generating by the service provider a service provider challenge, generating by the service provider a session key, encrypting by the service provider the service provider challenge and the session key using the member's public key to generate a second cryptogram, formatting by the service provider a key exchange response message including the second cryptogram and a response to member challenge, signing digitally by the service provider the key exchange response message, sending the digitally signed key exchange response message to the member, encrypting by the member a member response for the service provider challenge using the session key to generate a third cryptogram, attaching the third cryptogram to a transaction message going from the member to the service provider, signing digitally by the member the transaction message going from the member to the service provider, and sending the transaction message going from the member to the service provider to the service provider.

In a further aspect of the present invention, a method of communication using an electronic card having a public key of a service provider includes formatting a first key exchange request message at a first member, the first key exchange request message having a public key of the first member, and at least a portion of the first key exchange request message being encrypted using the service provider's public key from the electronic card, sending the first key exchange request message from the first member to a second member, combining at a second member, a second member key exchange request message with the first member's key exchange request message and sending the combined key exchange request message, signed by the second member, to a service provider, formatting a key exchange response message at the service provider including a first session key for the first member, signing the response message, formatting a key exchange response message including a second session key for the second member, combining the key exchange response messages into a combined key exchange response message, signing the combined key exchange response message, and sending the combined key exchange response message to the second member, and separating at the second member, the key exchange response message for the second member from the key exchange response message for the first member, and forwarding the key exchange response message for the first member to the first member.

In yet a further aspect of the present invention, a method of communication using an electronic card having a public key of a service provider includes formatting a first key exchange request message at a first member, the first key exchange request message having a public key of the first member, and at least a portion of the first key exchange request message being encrypted using the service provider's public key from the electronic card, sending the first key exchange request message from the first member to at least one intermediate member coupled in series between the first member and the service provider, each of said at least one intermediate member being either a message router or a participating member, generating, if said at least one intermediate member comprises at least one participating member, at each of the participating members a key exchange request, receiving at the service provider a combined key exchange request message from said at least one intermediate member, the combined key exchange request message comprising the first key exchange request message and the key exchange request message generated by each of the participating members, generating at the service provider a first session key for the first member and a participating session key for each of the participating members, formatting at the service provider a key exchange response message including each of the first and participating session keys, sending the key exchange response message from the service provider to said at least one intermediate member, separating by each participating member its respective participating session key from the key exchange response message, and sending the first session key from said at least one intermediate member to the first member.

In another aspect of the present invention, a method of communication using an electronic card having a public key of a service provider includes formatting a key exchange request message at each of a plurality of first members, the key exchange request message for one of the first members having a public key of said one of the first members, and at least a portion of the key exchange request message for said one of the first members being encrypted using the service provider's public key from the electronic card, sending from each of the first members its respective key exchange request message to a second member, the second member being either a message router or a participating member, generating, if the second member is a participating member, a second key exchange request message at the second member, combining at the second member the key exchange request message from each of the first members to form a combined key exchange request message, the combined key exchange request message further comprising the second key exchange request message if the second member is a participating member, receiving at the service provider the combined key exchange request message from the second member, generating at the service provider a first session key for each of the first members, and a second session key for the second member if the second member is a participating member, formatting at the service provider a key exchange response message including each of the first and second session keys, sending the key exchange response message from the service provider to the second member, separating by the second member the second session key from the key exchange response message if the second member is a participating member, separating by the second member the first session key for each of the first members from the key exchange response message, and sending each of the first session keys to its respective first member.

DETAILED DESCRIPTION

Figure 1:
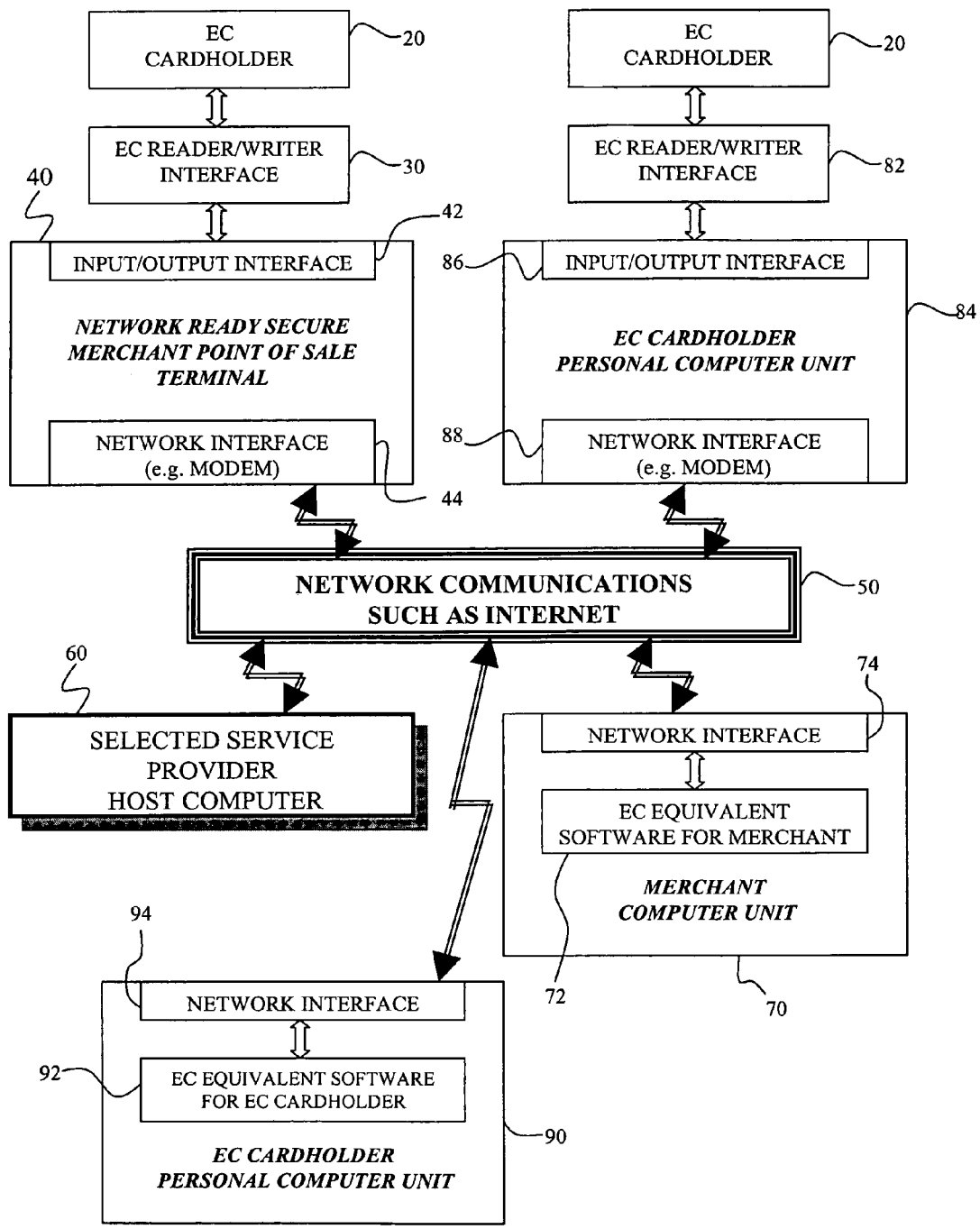
FIG. 1 is a block diagram showing the relationship among the components of a system according to an embodiment of the invention.

A preferred embodiment of the invention is a cryptographic system and method for electronic transactions by using an electronic card (EC) in the form of a smart card or equivalent software and communicating over a communications network.

The preferred embodiment of the invention uses an open network, such as the Internet. Alternative embodiments of the invention may use other types of networks. An embodiment of the invention may either use a physical smart card, or alternatively, a smart card, which is implemented as computer software package and runs on a computing device such as a personal computer (PC). Likewise, a merchant involved in a transaction may use a merchant device, which is a point-of-sale terminal, or a device, which uses software on a host computer to communicate with an EC and a service provider. When a smart card is used, a smart card reader is also needed to allow the card to communicate with a host device, such as a network ready merchant terminal, a PC, or any other electronic device, which is capable of supporting smart card transactions.

In a public key and digital certificate based system, transaction participants exchange public information through the use of digital certificates or other electronic credentials which are issued and certified by a certificate authority (CA) or credential binding server. The communication between the CA or the server and each participant of the transaction must be secure. Random numbers and digital signatures are used to ensure the authenticity and validity of the messages transmitted among the participants.

The cryptographic system and method of the preferred embodiment of the invention also uses public/private key cryptography, but it works in a slightly different way. The cryptographic system and method does not seek to create another kind of trust relationship as the one that exists between holders of digital certificates and the certificate authorities. It particularly targets large membership-based financial institutions such as a large credit card company and all its cardholders, or a major bank and all its ATM cardholders as its potential users. Non-financial institution can also use this cryptographic system and method to conduct commercial or non-financial transactions over a network.

A service provider (SP) provides some service to its members. Financial institutions are just one kind of service provider. A service provider can also be non-financial in nature. Regardless whether a service provider is a financial institution or a non-financial institution, essentially the same process occurs. The only difference between a transaction involving a financial institution and a transaction involving a non-financial institution is that the messages may include different data fields.

When an EC holder signs up with one of the service providers, the service provider creates a dedicated entry on the EC. Each entry contains the account information for the service provider, the SP's public key, access control information, and other related data. Each EC can support a predetermined number (e.g. ten) of such entries and each such entry is a representation of one service provider.

By using the public/private key cryptography, the key distribution process is much simplified. The EC holder him/her/self or any trusted third party such as a bank branch or even a post office can perform the task. The SP's public key is only used for the initial key exchange between the SP and the cardholder. After the initial key exchange step, the SP assigns a session key, which protects any further message exchange between the cardholder and the SP or between the cardholders' themselves.

This hybrid system, which uses both public key/private key cryptography and secret key cryptography (i.e., session key), is in contrast to other secret-key systems in that in the hybrid system, the secret key (i.e., session key) is valid for a single session and is not applicable to other sessions. A session has a determinate length of time. A session may terminate based upon a time period or upon conditions being satisfied.

Where a merchant is involved in a transaction, the merchant goes through essentially the same procedures as the EC holder to communicate with the SP. The merchant will first perform a key exchange with the SP and receive a session key. The session key will be used by the merchant for subsequent communication with the SP. The cardholder and the merchant digitally sign each message going to the SP and the SP similarly signs the response message going back to the cardholder and the merchant.

In the event that a transaction requires interactions with another certificate-based system, the SP, after authenticating the cardholder and the merchant based on further information exchange after the initial key exchange, can act as a surrogate-certificate for the cardholder and the merchant. In the most extreme case, the SP performs solely this surrogate function and becomes a gateway for the certificate-based system. This type of hierarchy is highly desirable since it reduces the number of trust relationships needed to carry out a transaction among multiple systems. In addition, it eliminates the users' need to carry certificates.

The preferred embodiment of the invention is a cryptographic system and method for electronic transactions by using an electronic card (EC) in the form of a smart card or equivalent software and communicating over a communications network.

In the preferred embodiment of the invention, the network is an open network such as the Internet. In alternative embodiments of the invention, other open networks and/or closed networks may be used to establish communication between a service provider and its members. For example, a service provider may use its own proprietary financial network to communicate with its members.

Any Internet protocol may be used for Internet connections. Example protocols, which can be used include TCP/IP, UDP, HTTP, and the like.

Communication may also be via a communications network transport service such as the Public Switched Telephone Network (PSTN) using traditional analog telephone service (a.k.a. Plain Old Telephone Service or POTS), or by using a digital communication service such as a T-1, E1 or DS-3 data circuit, Integrated Services Digital Network (ISDN), Digital SubscriberLine (DSL) services, or even using a wireless service, and the like. When implemented using such a service the invention may be implemented independent of a communications protocol (i.e. at an electrical interface layer).

Communication may also be via a local area network (LAN) or Wide Area Network (WAN) such as Ethernet, Token Ring, FDDI, ATM or the like. Example protocols, which can be used include TCP/IP, IPX, OSI, and the like.

Other communication links might include an optical connection, a wireless RF modem connection, a cellular modem connection, a satellite connection, etc.

The invention may be employed as long as a communication path can be established between a service provider and its members. The examples above are intended to illustrate several examples of the various communications environments in which the invention may be practiced. As is clear to one ordinarily skilled in the art, the invention is not limited to those environments detailed above.

The EC can take the form of a smart card device or a software package running on a computer system such as a personal computer (PC). When the EC is implemented on a smart card, it can be used on a network-ready computer system such as a PC to transact with another member and/or a selected service provider. It will need a read/write interface device to communicate with a computer system and some application software such as an Internet browser to interface with the cardholder and the network. If the EC is a software package loaded into a computer system, then no read/write interface is needed. The exemplary embodiment of the invention is for the EC to act as an electronic wallet (or cyber wallet) which functions similar to real wallet. A real wallet can carry credit cards, debit cards, ATM cards, health provider cards, membership cards, cash, etc. An EC has the digital equivalent of all the above-mentioned financial and non-financial instruments and enables conducting secure transactions over the Internet.

A service provider member can be a merchant and/or an EC cardholder. A merchant is a member who is paid by the service provider as a result of a transaction. A member can be both a merchant and an EC cardholder. A merchant may engage in a transaction with other cardholders, which results in the merchant being paid by the service provider. A merchant may also be an EC cardholder and purchase supplies, for example, from a merchant supplier.

The cryptographic system may involve communication between a service provider and any number of service provider members. Thus, communication can be between an EC and an SP, between a merchant and an SP, between a first EC, a second EC, and an SP, between a first merchant, a second merchant, and an SP, etc. An EC may communicate directly with a service provider to inquire about an account balance for example. A merchant may communicate with a service provider only on his own behalf and not on behalf of an EC because, for example, the merchant wants to know his own account balance with the service provider. Communication between the SP and its members may follow any permutation of the SP and its members. The organization of the communication links between the SP and its members may be serial and/or hierarchical. Communication between the SP and its members may also be serial and/or via routers, which route the messages between the SP and its members.

The cryptographic method is a two-phased key-exchange-transaction model. The first phase is a key exchange phase. The second phase is the transaction phase. In the key exchange phase, the members exchange keys with the service provider. The members send their keys to the service provider and the service provider uses the keys to send a session key to the members. The session key protects any further message exchange between the cardholder and the SP or between the cardholders' themselves. In the transaction phase, either the SP can direct the transaction or the cardholders themselves may conduct the transaction.

FIG. 1 is a block diagram showing the relationship among the components of a system according to an exemplary embodiment of the invention involving a cardholder, a merchant, and service provider.

An EC cardholder 20 can conduct a transaction over a network 50 and communicate with a merchant either by using an EC read/write device 82 attached to an originating computer 84 or by using EC equivalent software 92 running on an originating computer unit 90.

A merchant can conduct a transaction over a network by either using a network-ready point-of-sale(s) (POS) terminal 40 or by using EC equivalent software running on a merchant device 70 to conduct an electronic transaction with a selected service provider 60 via a network 50 such as the Internet.

Once the access conditions to the card have been satisfied, the cardholder can perform financial or non-financial transactions with other participants of the system through the network 50. In FIG. 1, there are three different scenarios in which a transaction over a network can be conducted.

(1) In a POS transaction (Upper left side of FIG. 1), the cardholder 20 swipes/inserts an EC through/into a merchant's EC reader/writer 30 at a merchant's premises. The EC reader/writer is connected to a network-ready merchant POS terminal 40. The network-ready merchant POS terminal 40 is a secure tamper-resistant programmable device comprising an input means such as a keyboard, a display device, a processing unit, and an EC read/write device 30 (an EC interface device). It is typically a small computer unit such as a PC equipped with a communication link to an open network. The POS terminal communicates to the SP via the network 50.

(2) (Right side of FIG. 1) A cardholder can conduct a transaction with other participants of the system by inserting the EC 20 into a read/write device 82, which is connected to the cardholder's personal computer 84 which is the originating computer. The originating computer connects to a network 50 allowing the EC to communicate with the merchant computer unit 70. The merchant computer unit 70 has EC equivalent software 72 that enables the merchant to receive the EC generated message and generates a message combining EC information and merchant information. Then, the combined message is sent to the SP over a network.

(3) (Bottom side of FIG. 1) A cardholder can conduct a transaction with other participants of the system by using EC equivalent software 92 on the customer cardholder's personal computer 90. The transaction begins at the originating computer unit 90, that is, the cardholder's personal computer. The cardholder conducts the transaction over a network 50 and communicates with the merchant's computer unit 70, which in turn communicates with the SP 60 over a network 50.

While in the preferred embodiment of the invention, a personal computer is used to hold the EC equivalent software, in alternative embodiments of the invention other electronic devices can be used to hold the EC equivalent software.

In the preferred embodiment of the invention, the network used to enable the EC to communicate with the merchant is the same network used to enable the merchant to communicate with the SP. In another embodiment, the network used to enable the EC to communicate with the merchant may not be the same network used to enable the merchant to communicate with the SP. In yet another embodiment, the network used to enable one merchant to communicate with the SP may not be the same as the network used to enable another merchant to communicate with the SP. In still yet another embodiment, the network used to enable an EC to communicate to the merchant may not be the same as the network used to enable another EC to communicate with another merchant. An embodiment may consist of a multiplicity of networks whereby different parties communicate.

Figure 2:
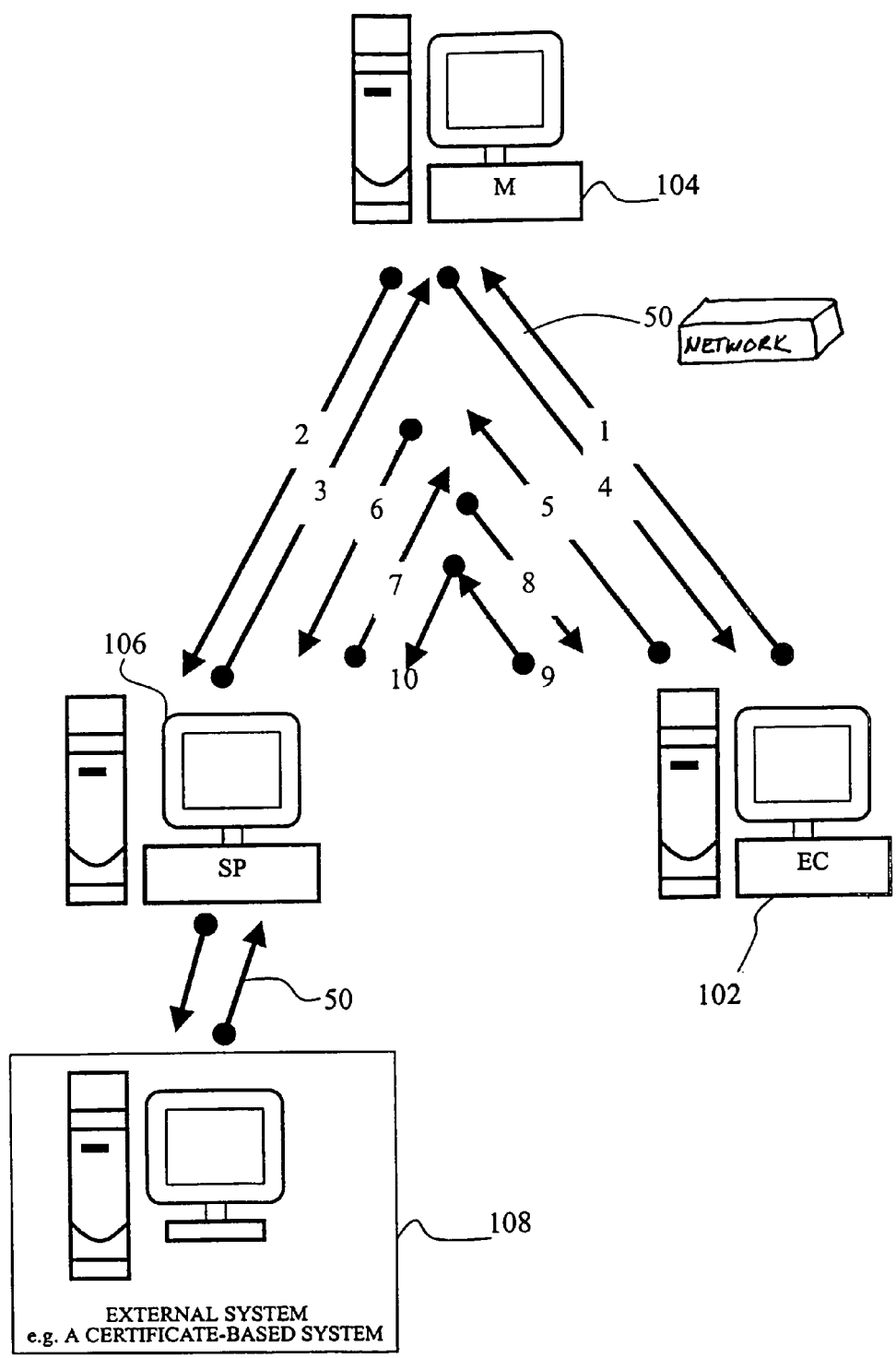
FIG. 2 shows the flow of the two transaction phases via a network.

In the preferred embodiment of the invention, a transaction is broken down into two phases: a key exchange phase and a transaction phase. FIG. 2 is a specific case, which illustrates the two-phase key-exchange-transaction model where the SP directs the transaction phase. There is no direct exchange of sensitive information between participants when the SP directs the transaction.

The key exchange phase is the same where the transaction phase is among the cardholders themselves and where the SP directs the transaction phase. Where the transaction phase is among the cardholders themselves, the cardholders use the SP session key to communicate with each other and conduct a transaction.

FIG. 2 demonstrates a financial transaction where the SP directs the transaction phase. The transaction shown involves three parties: an EC (a transaction originator) 102, a merchant 104, and a service provider (SP) 106. The originating party is an EC cardholder who is the consumer and is represented by the computer unit 102. The computer unit 104 represents the merchant. The computer unit 106 represents the service provider. An SP is selected by both an EC and merchant.

FIG. 2 demonstrates a financial transaction wherein the process flow is from an EC to a merchant to an SP. The cryptographic method's process flow is not limited to any particular order between merchants and EC cardholders. FIG. 2 is merely an example of a particular transaction, which flows from EC to merchant to service provider. The process flow can also go from merchant to EC to service provider. FIG. 2 demonstrates how service provider members (in this case, the EC cardholder and the merchant) create, append, and send messages to a service provider.

The ten arrows numbered 1 to 10 in FIG. 2 show how the messages flow among the three parties during the two transactions phases. Steps 1 through 4 belong to the key exchange phase and steps 5 through 10 belong to the transaction phase. In FIG. 2, the merchant serves as an intermediary between the EC and SP. In step 1, the key exchange request is formatted by the EC and sent to merchant. In step 2, the merchant combines his own key exchange message with the EC's key exchange message and sends the combination key exchange message to an SP. In step 3, the SP formats a key exchange response for the merchant, formats a key exchange response for the EC, combines the key exchange responses to form a combined key exchange response and sends the combined key exchange response to the merchant. In step 4, the merchant separates the key exchange response for the merchant from the key exchange response for the EC and forwards the EC's key exchange response message back to the EC. Step 4 concludes the main activities in the key exchange phase.

The transaction phase begins with step 5. In step 5, the EC formats its transaction request message and sends it to merchant. In step 6, the merchant combines the received transaction request message with his own transaction request message and sends the combination transaction request message to the SP. In step 7, the SP formats a transaction response message for the merchant, formats a transaction response message for the EC, combines the transaction response messages and sends the combined transaction response message back to merchant. In step 8, the merchant separates the transaction response message for the merchant from the transaction response message for the EC and forwards the EC's transaction response message back to the EC. In step 9, the EC formats a confirmation message and sends it to the merchant. In step 10, the merchant combines the received confirmation message with his own confirmation message and sends the combination confirmation message the SP. Step 10 concludes the transaction phase of a transaction.

While FIG. 2 demonstrates a simple transaction, some transactions may involve multiple messages. During some transactions, more than one message may be required to complete each phase, in which case, those messages will follow the same rules of combination and flow pattern. For example, during the transaction phase, the SP may require that the EC and the merchant send over account information first. If the account information is verified to be valid, the SP sends confirmation of the account information in the response message. Once the merchant and the EC receives the response message, then the EC and the merchant send the transaction amount and other transaction related information in the next message going to the SP. The SP subsequently approves or disapproves the transaction. The steps in FIG. 2 apply to both the account message and the transaction message.

If the completion of a transaction requires interaction with some external system such as a public key and digital certificate based system 108, the SP will act as a surrogate-certificate for the EC and the merchant and deal with the external system on behalf of the EC and the merchant. A desired result of the invention is to shield all of the participants of a transaction from an external system and therefore reduce the number of trust relationships needed to complete a transaction. If a participant of a transaction has dual membership of this system and an external system, then he has a choice of either acting as a member of this system or as a member of an external system. In the latter case, the SP will interface with the participants using the rules of an external system. For example, to deal with an external public and digital certificate or credential based system, the SP has in its possession all of the required certificate(s) or credential(s) which satisfies the trust relationship demanded by the external system. Such credentials are required in order for the SP and the external system to complete the transaction initiated by the EC and the merchant. In this case, only the SP needs to have a trust relationship with the external system. Based on this trust relationship, individual ECs and merchants are able to complete transactions with the hypothetical external system.

Figure 3:
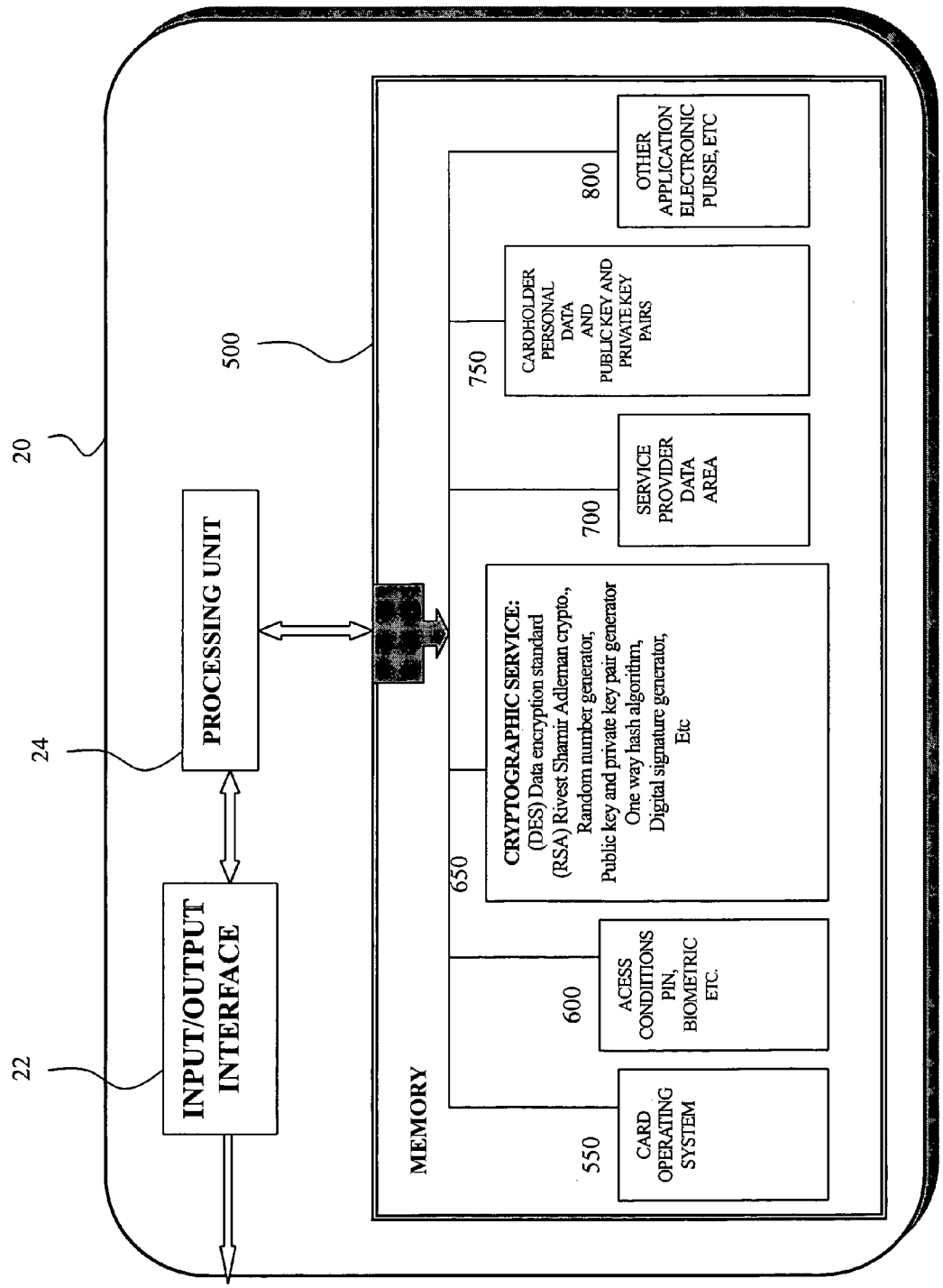
FIG. 3 is the diagrammatic representation of an EC.

FIG. 3 is a diagrammatic representation of a preferred embodiment of an EC. In a preferred embodiment of the invention, an EC is internally composed of the software/hardware components shown in FIG. 3. The EC is ISO 7816-based and supports the same kind of communication protocols and commands as defined in ISO 7816.

The EC has a card operating system 550 to manage the EC's internal resources. The on-card cryptographic service 650 can be implemented in software or be provided by a cryptographic co-processor (not shown in FIG. 3), or other hardware solutions, or a hybrid of software and hardware.

One of the unique features of the EC is the service provider data area (SPDA) in the EC memory, which contains the service providers' account and key information. The service provider data area (SPDA) 700 contains a number of slots. In the preferred embodiment, the SPDA contains a pre-defined number (e.g. ten) of slots—one for each potential service provider. In another embodiment, the number of slots may be dynamically changed. A record for each service provider can be placed into an empty slot. Each record contains the account number, public key, and other related information for a specific service provider.

Depending on the EC design, the SPDA can optionally allow each SP to include some software (such as an "applet" in the JAVA terminology) to manage its own on-card data and provide an interface between the SP card data and the host application. In other words, the SPDA can contain more than just simple data; it can allow each SP to put a self-contained application program (such as an applet) on the EC to provide its own unique service to the cardholder. The advantage of this type of design is that the EC itself is now detached from the type of service it can provide. Each SP can bring with it its own service capability. When another SP replaces an on-card SP, there will be no change necessary to the EC platform. The new SP applet is simply loaded into the card and it will perform what it is designed to do.

In the SPDA, each service provider is allocated space for public keys. In many transactions, only one key pair is used, but for some online transactions, two or more key pairs are required. If the SP uses the same public/private key pair for both the incoming and the signing of outgoing messages, then one public key is enough. If the SP uses a different key pair for signing, then both SP public keys (one for incoming messages and one for the signing of outgoing messages) are required in the SPDA.

In the preferred embodiment of the invention, two public/private key pairs rather than one public/private key pair is used to communicate with other applications through a network because using two public/private key pairs rather than one public/private key pair provides greater security. One pair is used for decrypting an incoming message, i.e., the sender encrypts the message using the recipient's public key and the recipient decrypts the message using the corresponding private key. The other pair is for the sender to digitally sign the message he sends out and the recipient to verify the digital signature using the corresponding sender's public key. Each service provider is allocated space for the number of public keys used by the service provider. If the SP uses the same public/private key pair for both incoming messages and signing of outgoing messages, then one public key is enough. If the SP uses different key pairs for receiving and signing messages, then both of the SP's public keys are required in the SPDA.

In an alternative embodiment of the invention, more than two public/private key pairs may be required and used by a service provider for even greater security.

When an EC holder is issued a new financial or non-financial instrument, the issuing institution or a trusted third party will load the needed information comprising a record into an available slot. The information in the slot can be erased when the service provider account is closed. Some of the information in a slot can be read and modified during a transaction, e.g. an account balance. Some information such as account number is write protected, but can be read. Some information such as a private key is both read and write protected. The access conditions 600 contain security information such as PINs, biometric data, etc., that an EC user must submit to open the card for use or to gain access to the information stored on the card.

Traditional Personal Identification Numbers (PINs) or other security measures such as biometrics data are used to protect the EC. Biometrics involves the measurement of a cardholder's biological traits, such as physical traits and behavioral traits. A biometric system may measure an individual's fingerprints, hand-geometry, hand writing, facial appearance, speech, physical movements, keyboard typing rhythms, eye features, breath, body odor, DNA, or any other physical attribute of the cardholder. The functions provided by an EC can be activated only after all the access conditions have been satisfied. Each service provider residing on the card can optionally implement other access conditions.

Figure 4:
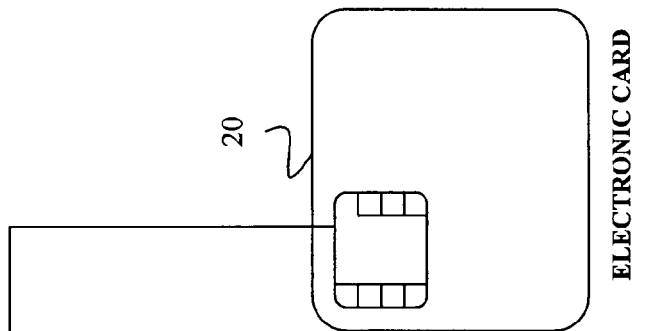
FIG. 4 shows the format of the service provider data area. Each service provider's information is allocated an entry in the table and is protected by access conditions.

FIG. 4 shows the format of the service provider data area of a preferred embodiment of the invention. Each service provider's information is allocated an entry in the table, which can be protected by additional access conditions. The PIN 712 and the miscellaneous data field 714 allows the service provider to provide extra protection or data field to the instrument it supports. The name field 702 contains the names of the service providers, which can be used by the cardholder at the beginning of an online transaction to initially select the applicable service provider for a transaction. The key type field 704 specifies the type of key the service provider chooses to use, secret key, public key, etc. The key value 706 and account information fields 708 contain information unique to each service provider. The card type field 710 specifies the type of instrument a service provider supports.

In the preferred embodiment of the invention, the on-card Operating System (COS) provides some fundamental services for the cardholder. Following is a list of general functions which can be performed by the COS:
(1) Traditional OS functionality such as Memory management, task management, etc
(2) External communication-read/write of user data and communication protocol handling.
(3) Loading and updating of on-card cardholder information.
(4) User PIN changes.
(5) Service Provider Data Area management-such as loading and updating of individual service provider information, SPDA access control, etc.

The COS will also provide support during various stages of a transaction. For example, the COS can handle the SP selection at the beginning of a transaction and record the transaction into a log file when the transaction has been completed. An embodiment of the invention may implement one of the following two design approaches to the COS or a hybrid of the two design approaches:
(1) Most of the intelligence can be put into the COS whereby the COS supports most of the EC functionalities. Consequently, each on-card service provider area relies on the COS to carry out the transaction with the merchant and the SP. In this approach, the COS can provide a uniform interface with the outside world for all on-card SPs and efficiently carries out the transaction once a SP has been selected.
(2) Alternatively, the COS can be a pool of general services each on-card SP can utilize. Each SP data area can contain applets, which have the intelligence to carry out a transaction with the merchant and the SP. In this approach, the SP has more opportunity to implement its own unique feature when performing a transaction.

Figure 5:
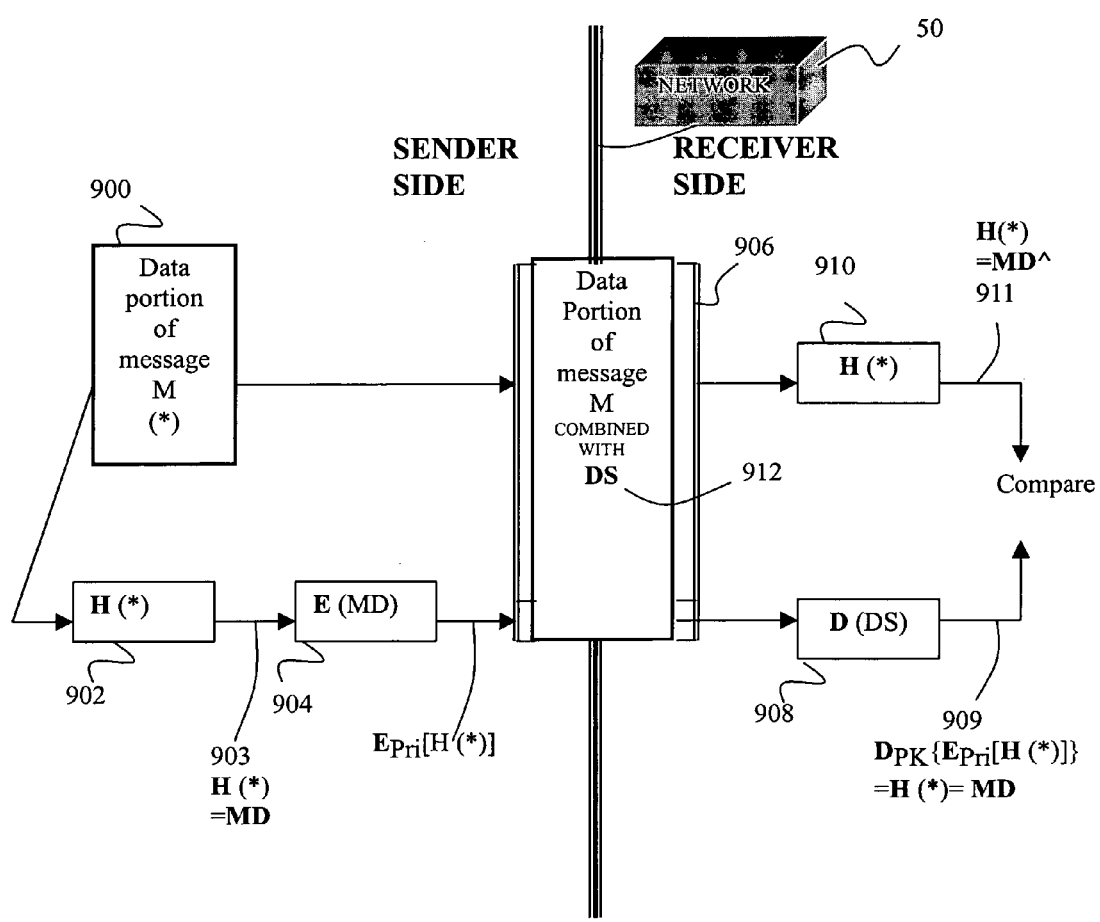
FIG. 5 shows how the digital signatures are used in an embodiment of the invention.

FIG. 5 shows how digital signatures are used in the preferred embodiment of the invention. A sender of a message first prepares and sends the data portion of a message M 900 through a one way hash algorithm, H(*) 902. The output from the hash algorithm is called the message digest MD of the data portion of message M 903. The MD is then encrypted, E(MD) 904, i.e. digitally signed, using the sender's private key (Pri). The result is called the digital signature DS of a data portion of a message M. The DS is then combined with the original data portion of the message M 900 and forms a complete message 906 ready for transmission to a recipient through a network 50.

The public-key encryption/decryption function can be any of a number of encryption/decryption functions. RSA, which takes its name from the first initials of RSA developers' last names (Ronald Rivest, Adi Shamir, and Len Adelman), is just one example of a public-key encryption/decryption method, which can be used in an embodiment of the invention.

When the intended recipient receives the message from a network 50, he first separates the data portion of the message M 900 from the digital signature 912 combined with it. The recipient then runs the data portion of the message M 900 through the same hash algorithm 910 that was used to encode the data portion of message M 900, and consequently obtains a message digest MD^ 911 of the data portion of message M. The recipient then decrypts D(DS) 908 using the EC's public key, the digital signature 912 contained in the original message using the sender's public key and recovers the original message digest, denoted here as MD 909. MD 909 is compared with the new calculated MD^ 911 for correctness. If they are not identical, the original message has been corrupted and should be rejected.

Following is a list of symbols and abbreviations used in the FIGS. 5 through 11:

Acknowledgement Data$_{EC}$=A part of the message sent back by the EC to the SP. It notifies the SP that the previous message has been successfully received and processed.

Acknowledgement Data$_M$=A part of the message sent back by the merchant to the SP. It notifies the SP that the previous message has been successfully received and processed.

AI$_{EC}$=Account information of EC holder.

AI$_M$=Account information of merchant.

CRYPTO=Cryptogram

D=Decryption function

D$_{SP-Private-Key}$=Decryption using SP's private key.

DS=Digital signature function.

DS$_{EC-Private-Key}$=Digital signature signed by the EC on a message.

DS$_{M-Private-Key}$=Digital signature signed by the merchant on a message.

DS$_{SP-Private-Key}$=Digital signature signed by the SP on a message.

E=Encryption function.

E (Data)=Encryption of data under a data encryption key.

E$_{SP-PK}$, E$_{SP-Public-Key}$=Data encrypted by SP public key

E$_{Skey-EC}$, D$_{Skey-EC}$=Encryption/Decryption using the session key that the SP generated for the EC.

E$_{Skey-M}$, D$_{Skey-M}$=Encryption/Decryption using the session key that the SP generated for the merchant.

EC=Electronic card, or electronic card equivalent software

H (M)=Apply a one-way hashing algorithm on M. It generates the message digest (MD) of M.

KE=Key exchange phase.

M=Merchant

MD=Message Digest

MD^=Message Digest produced by message recipient using the message just received as input data.

MD$_{EC}$=The message digest of a message going from EC to SP.

MD$_M$=The message digest of a message going from merchant to SP.

MD$_{SP-M}$=The message digest of a message going from SP to merchant.

MD$_{SP-EC}$=The message digest of a message going from SP to EC which is by passed by merchant.

PLAIN TEXT: Transaction data, which can be transmitted without encryption. Plain text can be different for different messages and transaction parties.

PLAIN TEXT$_{EC}$=Part of the transaction data provided by EC in its outgoing messages. Plain text data fields are not security sensitive. Therefore, they are transmitted without encryption. Note that the content of this symbol can be different when used in a different message.

PLAIN TEXT$_M$=Part of the transaction data provided by merchant in its outgoing messages. Plain text data fields are not security sensitive. Therefore, they are transmitted without encryption. Note that the content of this symbol can be different when used in a different message.

PLAIN TEXT$_{SP-EC}$=Part of the transaction data provided by SP for EC only in its outgoing messages. Plain text data fields are not security sensitive. Therefore, they are transmitted without encryption. Note that the content of this symbol can be different when used in a different message.

PLAIN TEXT$_{SP-M}$=Part of the transaction data provided by SP for merchant only in its outgoing messages. Plain text data fields are not security sensitive. Therefore, they are transmitted without encryption. Note that the content of this symbol can be different when used in a different message.

STD=Sensitive transaction data, which requires encryption during data transmission.

STD$_{EC}$=Sensitive transaction digital data provided by EC in its outgoing messages. Note that the content of this symbol can be different when used in a different message.

STD$_M$=Sensitive transaction digital data provided by merchant in its outgoing messages. Note that the content of this symbol can be different when used in a different message.

PK=Public key

EC-PK, PK$_{EC}$=Public key of the electronic card.

M-PK, PK$_M$=Public key of the merchant.

SP-PK, PK$_{SP}$=Public key of the selected service provider.

Response Data$_{SP-EC}$=A part of the message sent back by the SP to the EC during the transaction phase of a transaction. It can include approval/disapproval data and/or any other relevant data.

Response Data$_{SP-M}$=A part of the message sent back by the SP to the merchant during the transaction phase of a transaction. It can include approval/disapproval data and/or any other relevant data.

RN=Random number.

RN$_{EC}$=Random number generated by the EC and is sent to SP.

RN$_{SP-EC}$=Random number generated by the SP and is sent to EC.

RN$_M$=Random number generated by the merchant.

RN$_{SP-M}$=Random number generated by the SP and is sent to M.

SP=Financial or non-financial service provider

TA=Transaction (currency) amount.

Transaction Identification Number$_{SP-EC}$, TID$_{SP-EC}$ (Transaction ID$_{SP-EC}$)=A data field whose value is assigned by the SP during the key exchange phase of a transaction. The EC will use this value to communicate with the SP during the same transaction.

Transaction Identification Number$_{SP-M}$, TID$_{SP-M}$ (Transaction ID$_{SP-M}$)=A data field whose value is assigned by the SP during the key exchange phase of a transaction. The merchant will use this value to communicate with the SP during the same transaction.

*=Combine or concatenation of data within an encryption E or a decryption D.

Figure 6A:
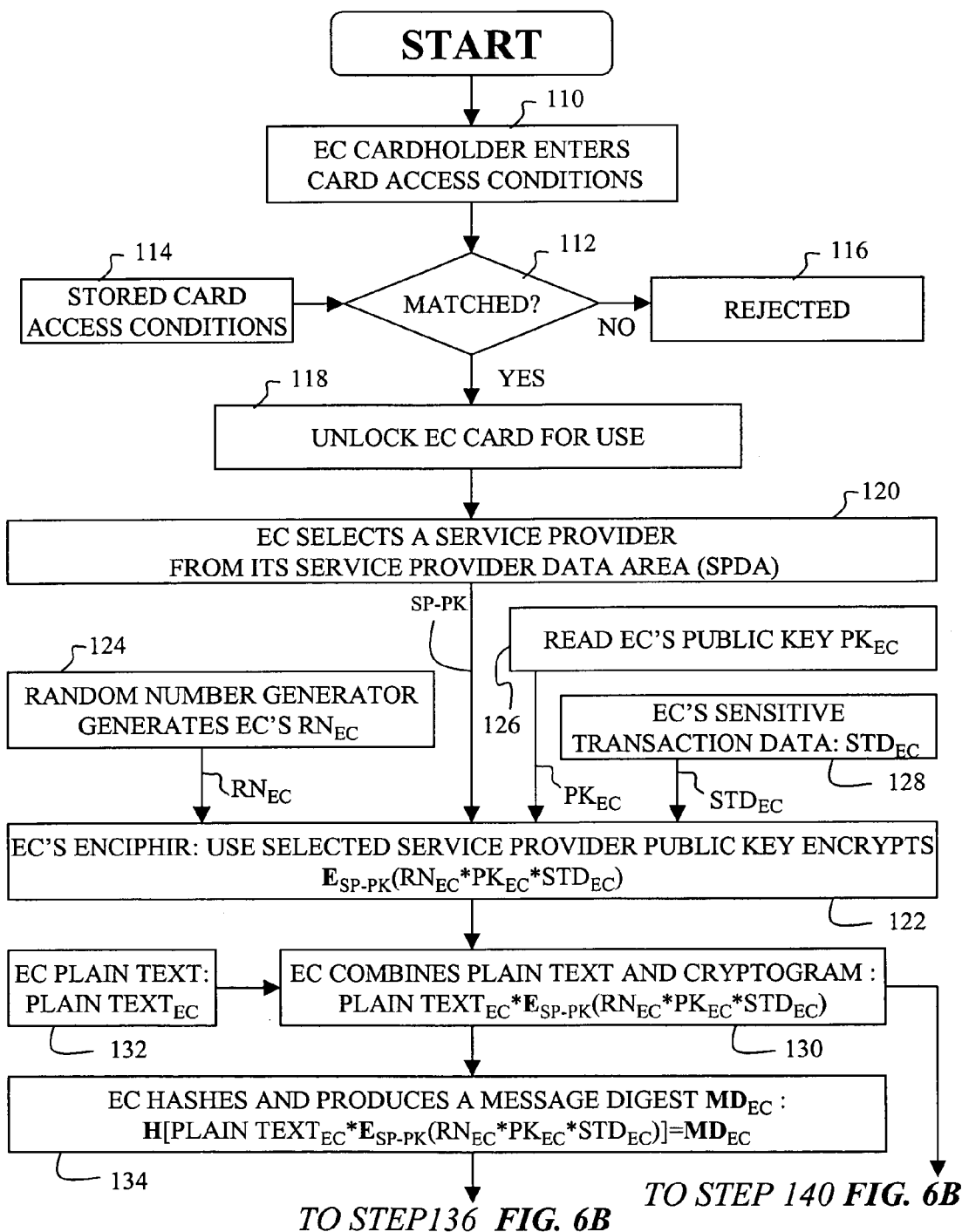
FIGS. 6A through 6Q shows the schematic flow chart of the cryptographic system and method used in an embodiment of the invention in order to conduct electronic transactions via an open telecommunication network, such as the Internet.
Figure 6B:
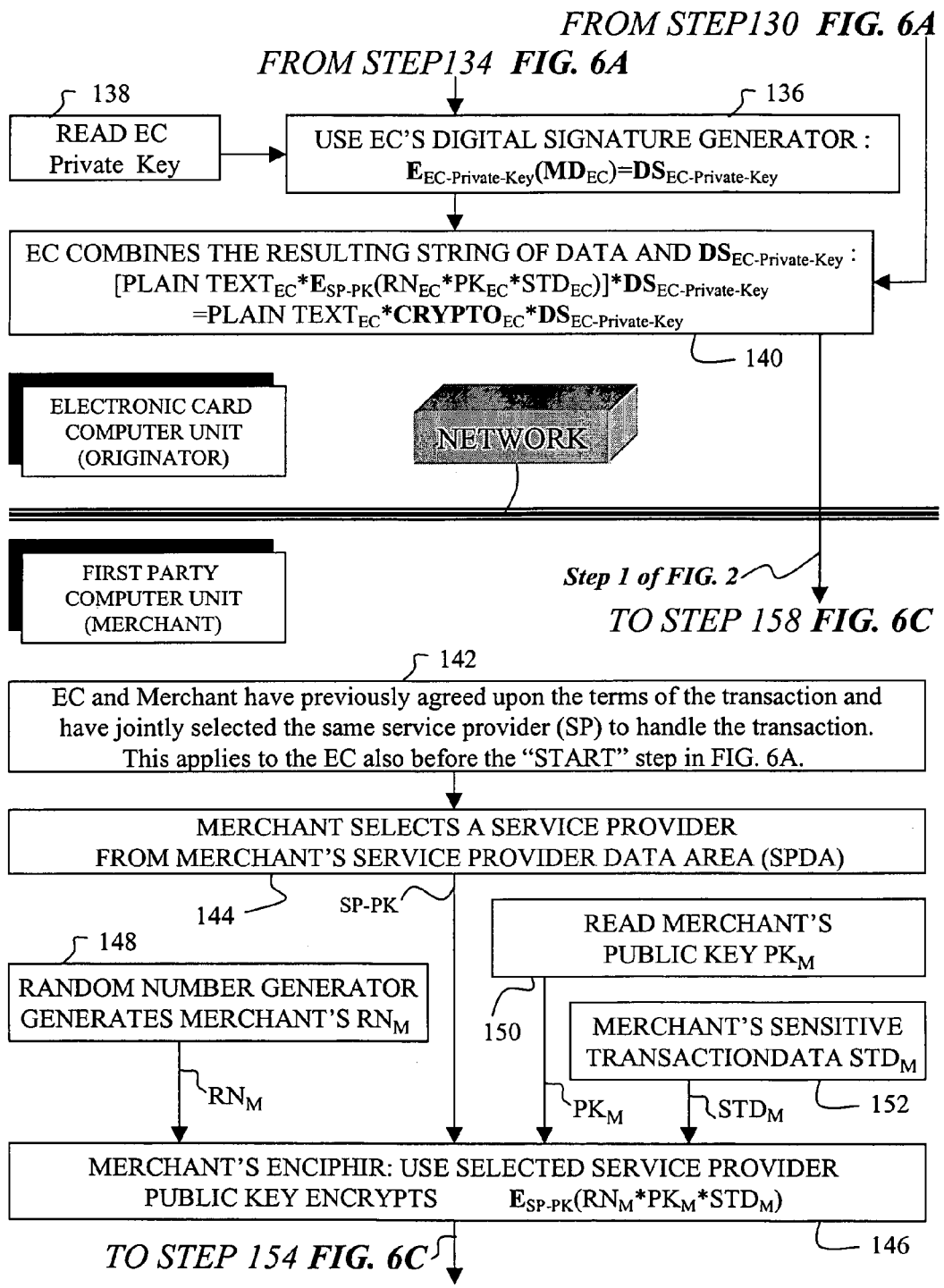
Figure 6F:
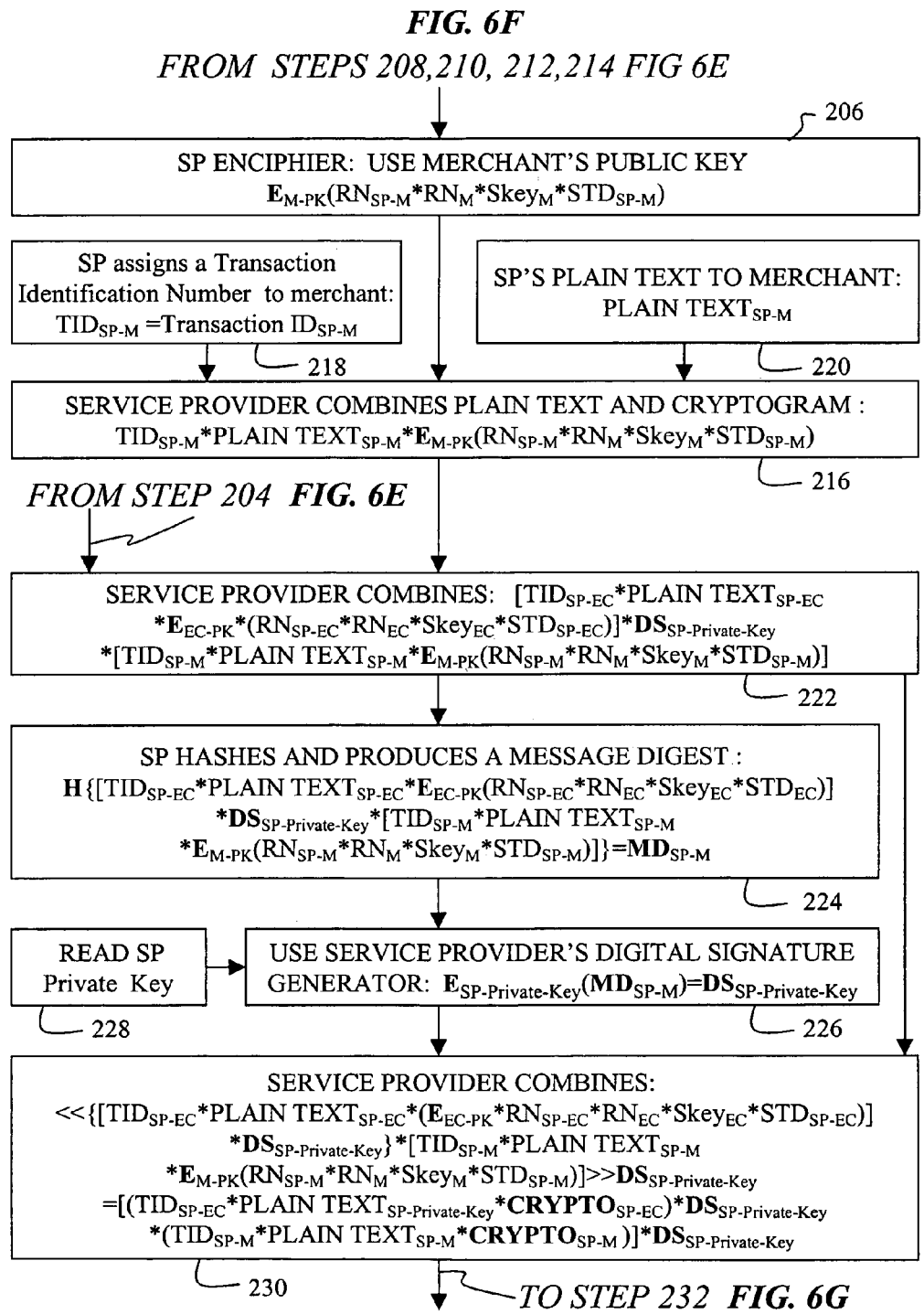
Figure 6G:
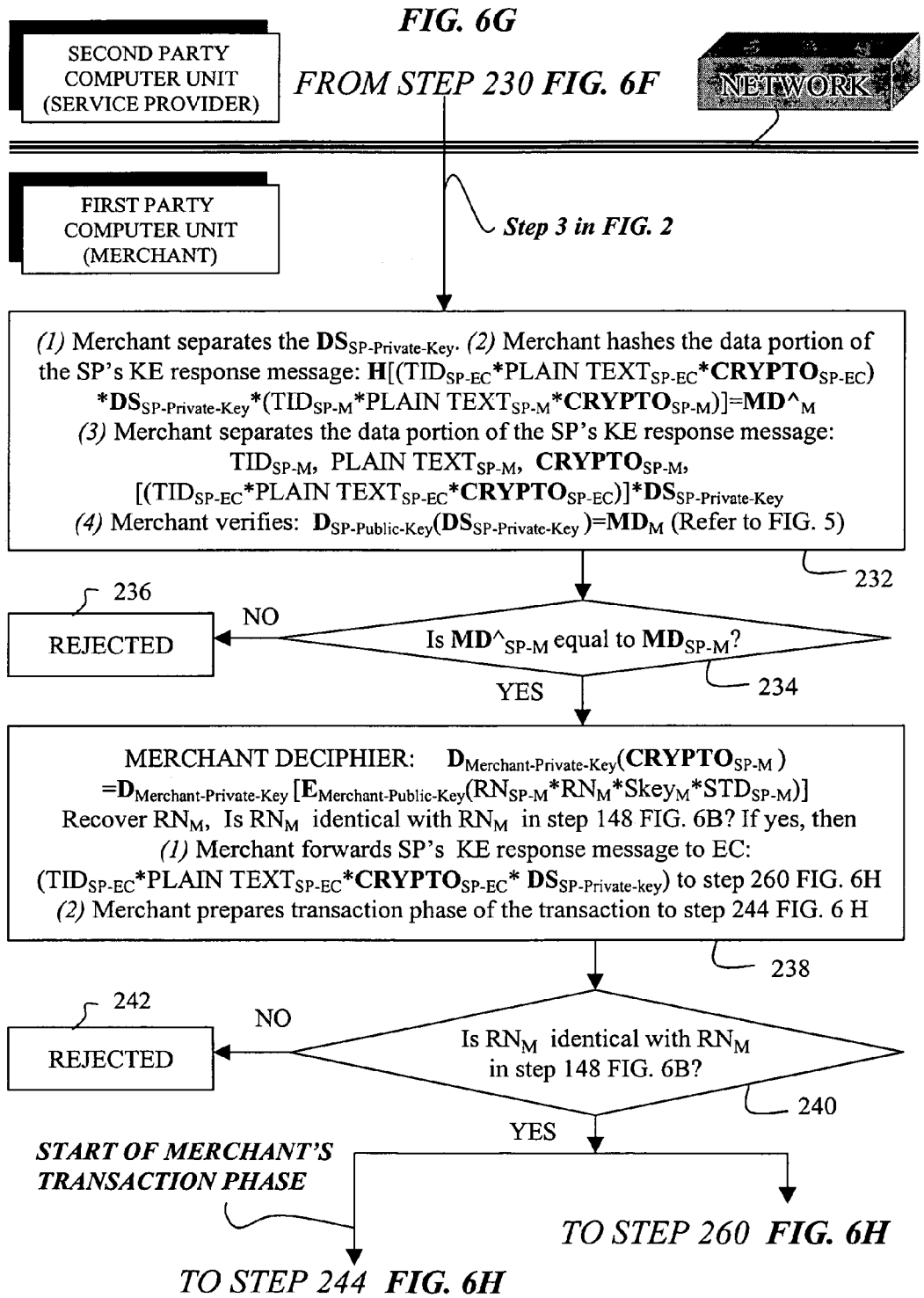
Figure 6I:
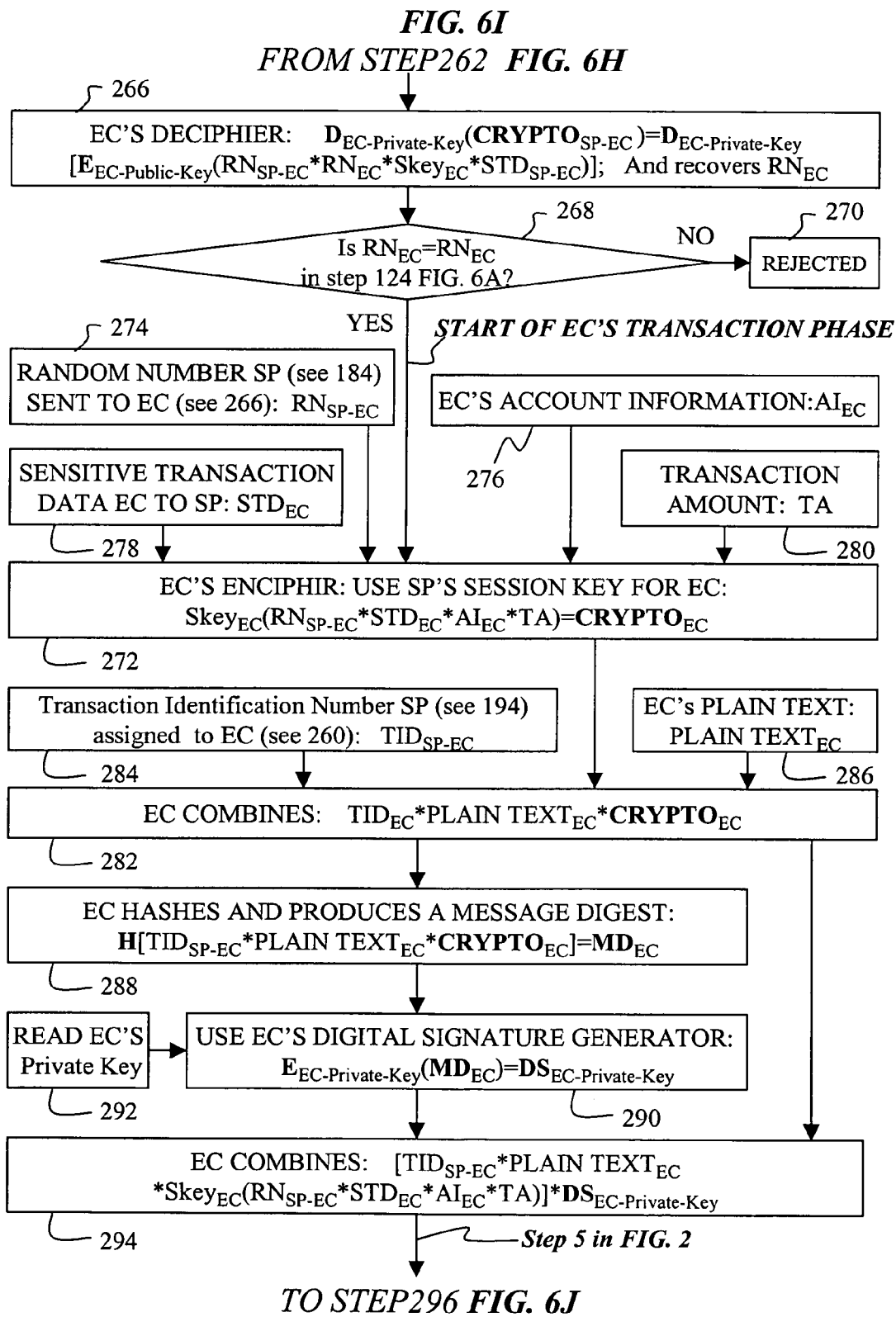
Figure 6M:
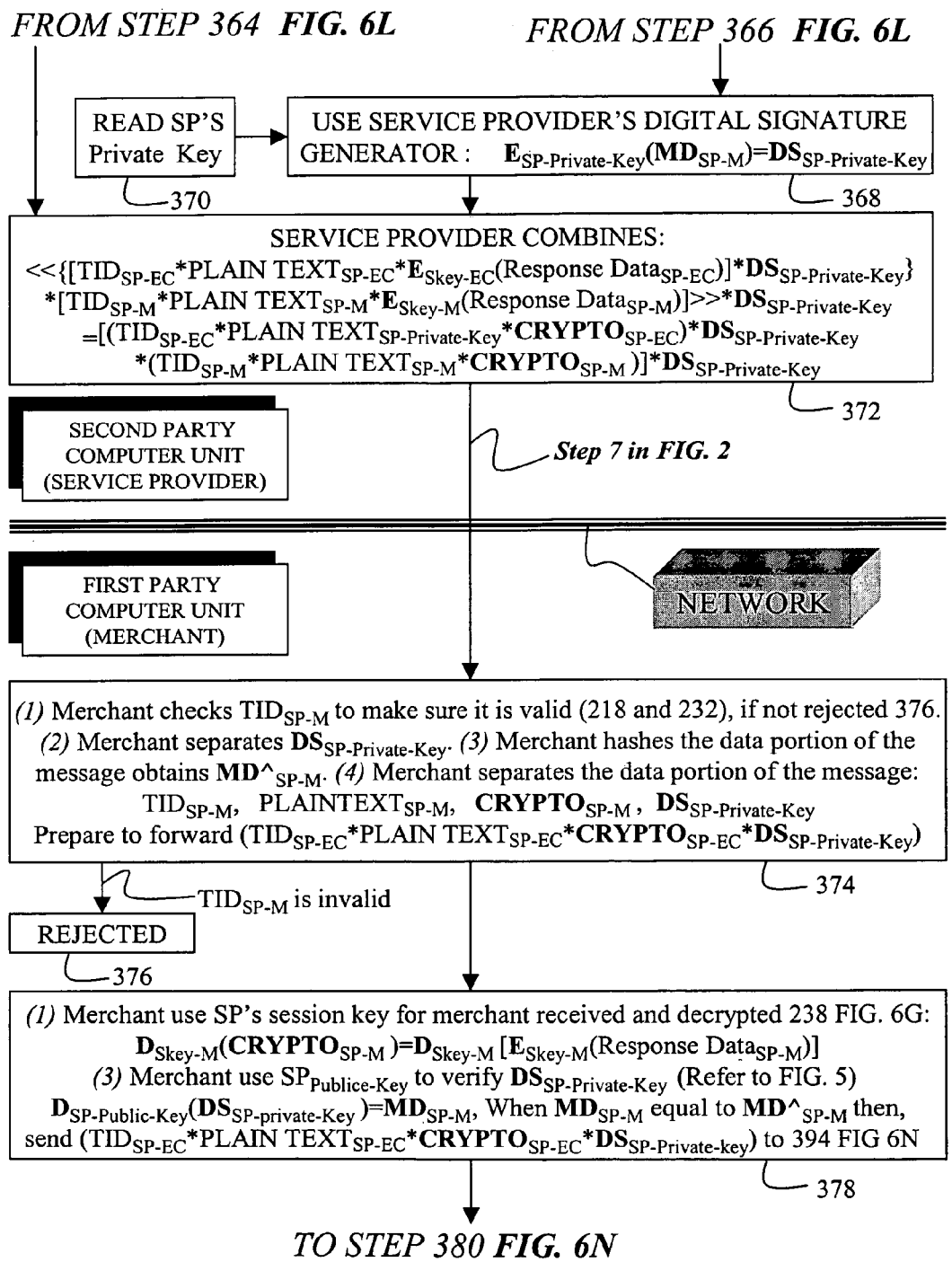
Figure 6N:
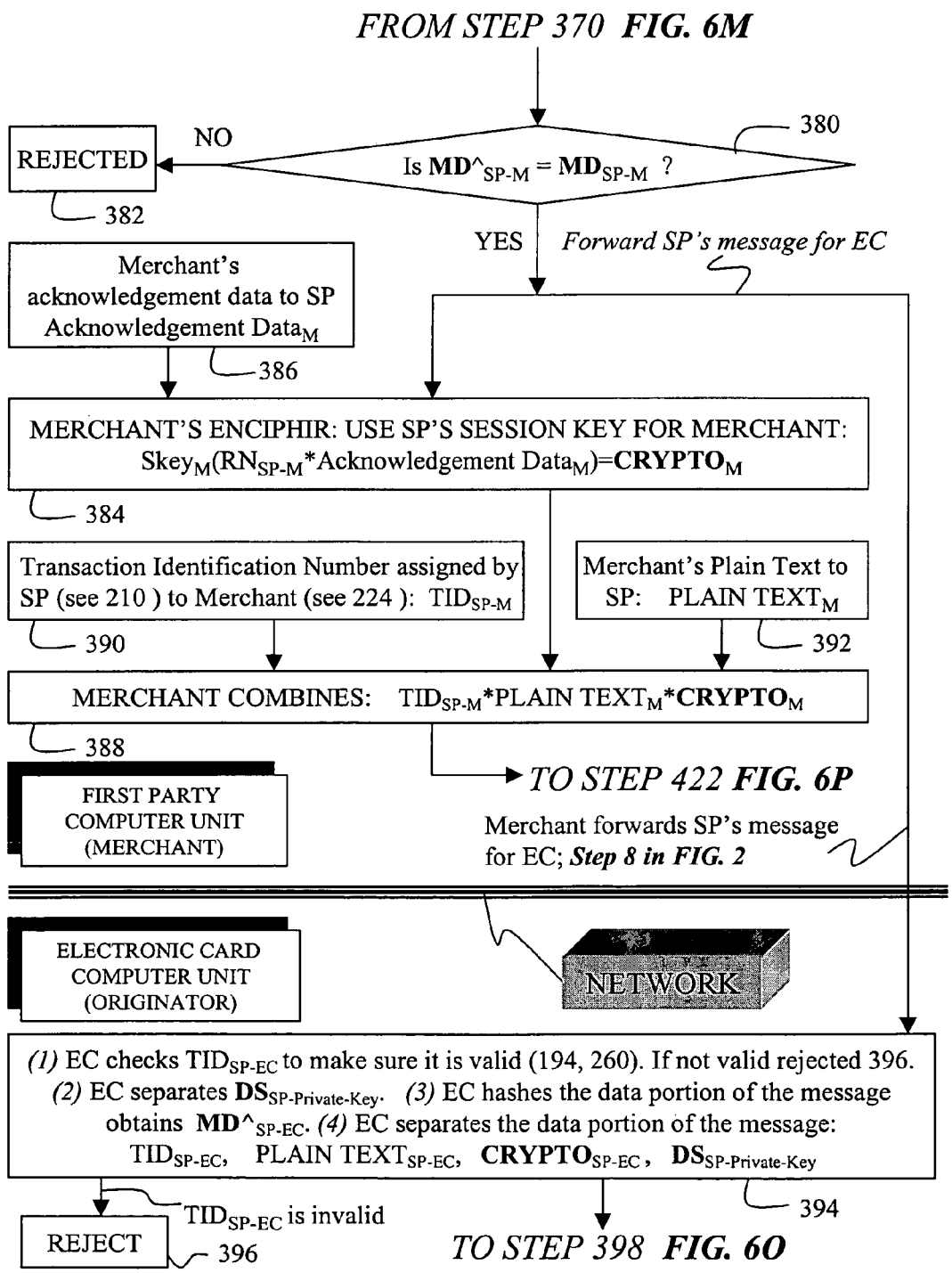
Figure 6O:
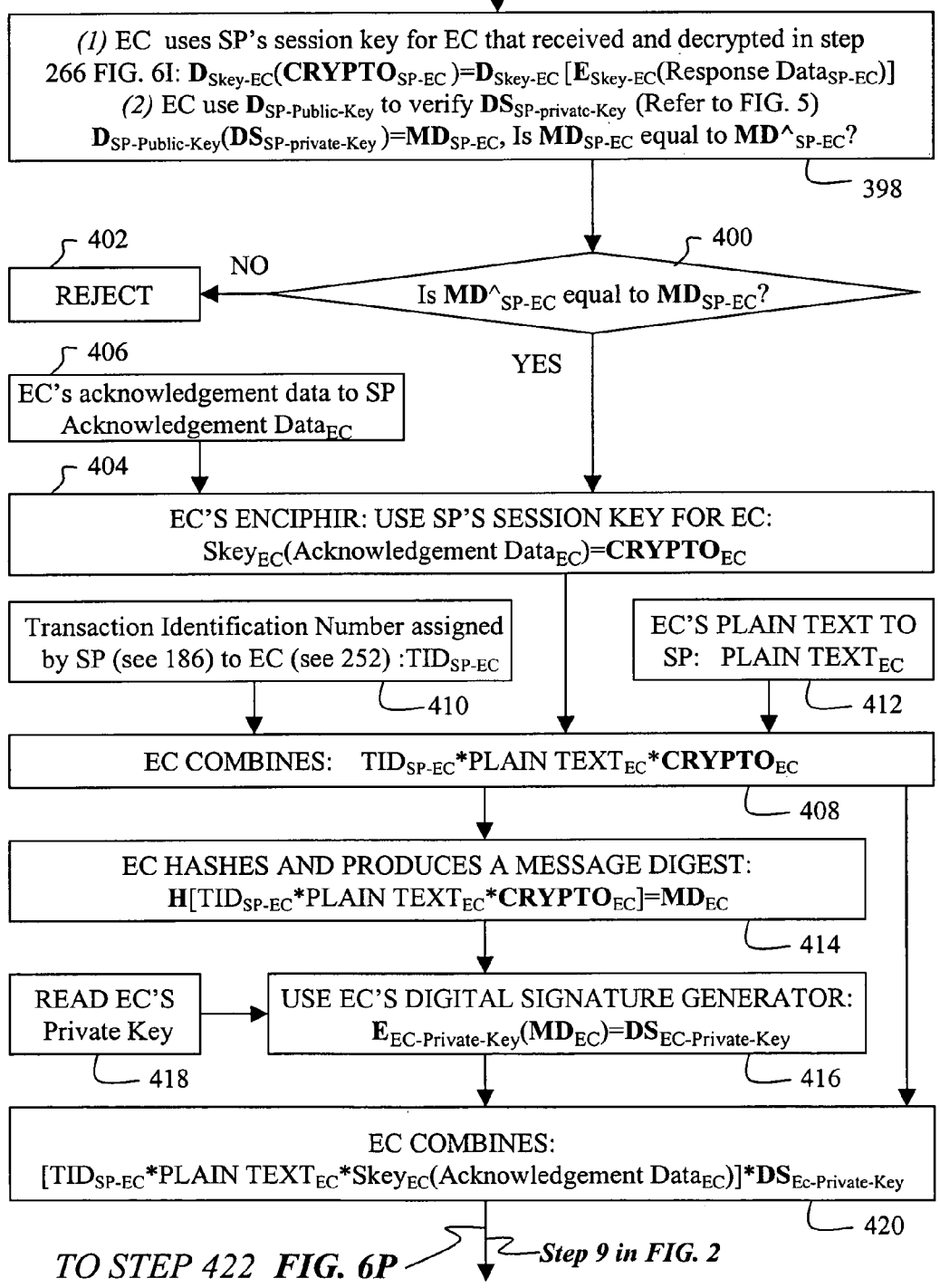
Figure 6Q:
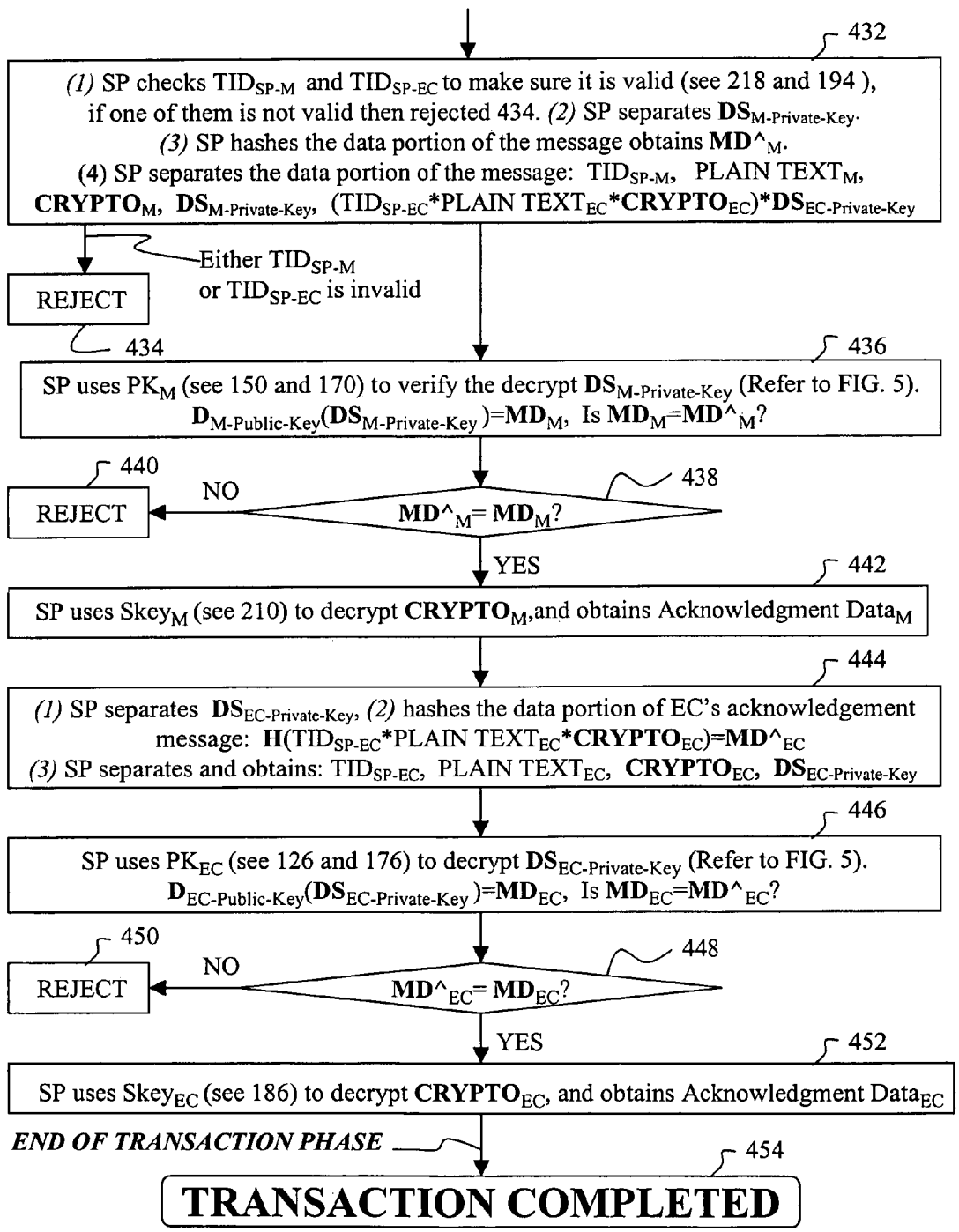

FIGS. 6A through 6Q comprise the flowchart for a preferred embodiment of the cryptographic system and method. For the purpose of simplifying the description and symbolism contained in FIGS. 6A through 6Q, the flowchart assumes that each of the parties involved in the transaction uses one key pair. In another embodiment of the invention, two public key pairs may be used, in which case, both public keys need to be exchanged.

The preferred embodiment of the invention consists of two distinct phases: the key exchange phase and the transaction phase.

Phase I: Key Exchange Phase (Handshake Phase)

The EC cardholder inserts the EC into a card read/write device or starts the EC equivalent software and enters a PIN number and/or satisfies the access conditions 110 to use the EC card. The entered security information conditions is compared 112 with the on-card information 114 to verify that user is authorized to use the EC. If the security information does not match the card security information, then the request to use the card is rejected 116. Otherwise, the card is unlocked 118 for use. Once the card is unlocked, the user can request the list of the on-card SPs available for selection and make a selection 120 by issuing an SP selection command to the EC. Once the SP is selected, the EC proceeds to start the key exchange (KE) with the SP. The public key of the selected SP, represented by the symbols SP-PK and PK$_{SP}$, is obtained from the EC's SPDA and is used to encrypt messages that will be sent to the SP.

The main purpose of the KE is to securely send the cardholder's public key, PK$_{EC}$ 126 and an EC random number, RN$_{EC}$ 124 to the SP. The SP response to the EC is to assign a session key and a transaction ID to the EC, which will be used by the EC to communicate with the SP for the rest of the transaction. To format the KE message, the EC generates a random number, RN$_{EC}$ 124, concatenates it with the EC's public key, PK$_{EC}$ 126, and EC sensitive transaction data STD$_{EC}$ 128 relevant to the transaction and/or required by the SP. The EC encrypts them 122 using the SP's public key, PK$_{SP}$, retrieved from the SPDA 120. The resulting EC cryptogram, E$_{ES-PK}$(RN$_{EC}$*PK$_{EC}$*STD$_{EC}$), is then combined 130 with the plain text portion of the message, PLAIN TEXT$_{EC}$ 132, if any, to form an EC combination message, PLAIN TEXT$_{EC}$*E$_{SP-PK}$(RN$_{EC}$*PK$_{EC}$*STD$_{EC}$). The EC's public key PK$_{EC}$ 126 may be placed in the plain text PLAIN TEXT$_{EC}$ instead of being encrypted when forming the EC combination message.

Only sensitive data is encrypted. Non-sensitive response data is included in the plain text. Only the SP is able to read the sensitive data. In a multi-party transaction, the SP has full access to the sensitive information of all the participants.

The resulting EC combination message is then sent through a hashing algorithm 134 to form a hash message, which is the EC message digest MD$_{EC}$. The EC message digest MD$_{EC}$ is digitally signed by the EC 136 using the EC private key 138 to form a digitally signed message DS$_{EC-Private-Key}$. The digitally signed message DS$_{EC-Private-Key}$ is then combined 140 with the EC combination message. The combination of the plain text PLAIN TEXT$_{EC}$, cryptogram CRYPTO$_{EC}$ and the digital signature DS$_{EC-Private-Key}$ is the KE message from the EC and is sent to the merchant 158 through a network. Plain text includes all the transaction data fields that are not sensitive in nature and therefore can be transmitted in a clear, discernable form; they do not need to be encrypted. These data fields are different for each message and are defined by the transacting parties.

To communicate with the SP, the merchant goes through essentially the same steps to format its own KE message with the SP as the EC goes through to format the EC's KE message with the merchant. The cardholder and the merchant do not communicate with the SP individually, but through a combined message. Consequently, there will be no need to exchange any confidential financial information between the cardholder and the merchant. The merchant prepares his device for the transaction 142 and selects from his own SPDA, which resides within the merchant's device, the same SP as the EC cardholder has selected for the transaction 144. The public key of the SP, represented by the symbols SP-PK and $PK_{SP}$, is obtained from the SP's SPDA and is used to encrypt messages that will be sent to the SP.

To format its own KE message, the merchant generates a random number, $RN_M$ 148, concatenates it with the merchant's public key, $PK_M$ 150, and the merchant's sensitive transaction data $STD_M$. Sensitive transaction data is data that is relevant to the transaction and/or required by the SP 152. The merchant encrypts 146 the combined data using the public key of the service provider, $PK_{SP}$. The resulting cryptogram is then combined 154 with the plain text portion PLAIN $TEXT_M$ 156 of the message, if any, to form a merchant combination message. The merchant's public key $PK_M$ 150 may be placed within the plain text PLAIN $TEXT_M$ instead of being encrypted when forming the merchant combination message PLAIN $TEXT_M*E_{SP-PK}(RN_M*PK_M*STD_M)$.

Figure 7:
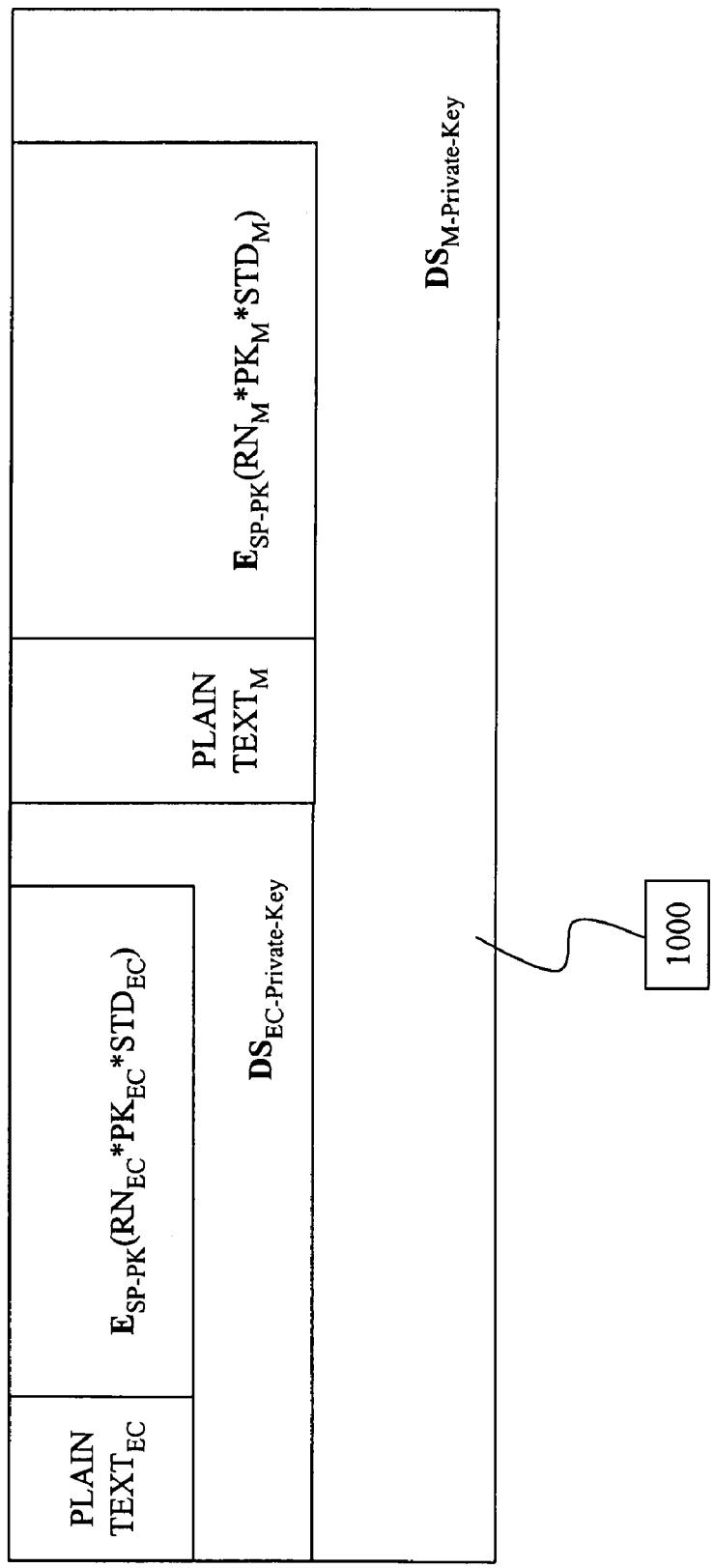
FIG. 7 through FIG. 11 depicts the final format and content of the combined request and response messages in the key exchange phase and the transaction phase.

The merchant combination message [PLAIN $TEXT_M*E_{SP-PK}(RN_M*PK_M*STD_M)$] is further combined 158 with the EC's KE message {[PLAIN $TEXT_{EC}*E_{SP-PK}(RN_{EC}*PK_{EC}*STD_{EC})]*DS_{EC-Private-Key}$} to form the data portion of the KE message for both the merchant and the EC, i.e., the EC-merchant combination message {[PLAIN $TEXT_{EC}*E_{SP-PK}(RN_{EC}*PK_{EC}*STD_{EC})]*DS_{EC-Private-Key}$}*[PLAIN $TEXT_M*E_{SP-PK}(RN_M*PK_M*STD_M)$]. The EC-merchant combination message is sent through a hashing algorithm 160 to form a hash message, which is the merchant message digest $MD_M$. The merchant message digest $MD_M$ is digitally signed 162 by the merchant using the merchant's private key 164 to form a merchant digitally signed message $DS_{M-Private\ Key}$. The merchant digitally signed message $DS_{M-Private\ Key}$ is then combined 166 with the data portion of the message, i.e., the EC-merchant combination message to form a key exchange request message <<{[PLAIN $TEXT_{EC}*E_{SP-PK}(RN_{EC}*PK_{EC}*STD_{EC})]*DS_{EC-Private-Key}$}*[PLAIN $TEXT_M*E_{SP-PK}(RN_M*PK_M*STD_M)$]>>*$DS_{M-Private-Key}$ for both the merchant and EC. This final message is sent to the SP through a network. FIG. 7 represents the final format and content of the key exchange request message from a merchant to an SP.

In the preferred embodiment of the invention, the merchant does not check the MD of the EC's request message $MD_{EC}$ because the EC encrypts his public key. However, in an alternate embodiment of the invention, if the EC chooses not to encrypt his public key then the merchant can optionally check the EC's MD before passing it to the SP. In either the case where the EC encrypts his public key or where the EC does not encrypt his public key, for enhanced security and to avoid possible processing errors by the merchant, the SP can still check the EC's MD. When the merchant receives a combination response from the SP for both himself and the EC, the merchant does not have to check the MD for the EC since it is part of the overall message formed by a single originator—the SP. The merchant only needs to check the MD of the overall message he receives from the SP.

When the SP receives the KE request message, the SP first separates 168 the data portion of the KE request message from the DS and feeds the data portion of the KE request message into a one-way hash algorithm to recalculate the message digest, which becomes $MD_M$. The SP then separates the merchant's plain text PLAIN $TEXT_M$, cryptogram $CRYPTO_M$, digital signature $DS_{M-Private-Key}$, and the EC's KE request message PLAIN $TEXT_{EC}*CRYPTO_{EC}*DS_{EC-Private-Key}$. Using its own private key, the SP decrypts merchant's cryptogram 170 and recovers, among other information, the merchant's random number $RN_M$ 148 and the merchant's public key $PK_M$ 150. The SP then uses the recovered $PK_M$ to decrypt the digital signature signed by the merchant $DS_{M-Private-Key}$ and recovers the $MD_M$ for the merchant's KE message. The SP compares 172 the newly hashed $MD\hat{}_M$ 168 with the $MD_M$ 170 recovered by decrypting the DS from the original KE message. If there is a discrepancy between $MD\hat{}_M$ and $MD_M$ found, then the KE message has been corrupted and is therefore rejected 174. If $MD\hat{}_M$ and $MD_M$ match, then the SP separates the data portion of the EC's KE request message from the DS and feeds the data portion of the EC's KE request message into a one-way hash algorithm to recalculate the message digest ($MD\hat{}_{EC}$). The SP then separates the EC's plain text PLAIN $TEXT_{EC}$, if any, cryptogram $CRYPTO_{EC}$, and digital signature $DS_{EC-Private\ Key}$, in the data portion of the EC's KE request message 176. Using its own private key, the SP decrypts EC's cryptogram and recovers, among other information, EC's random number $RN_{EC}$ and EC's public key $PK_{EC}$. The SP then uses the recovered $PK_{EC}$ to decrypt the digital signature signed by EC and recovers the $MD_{EC}$ for EC's KE message. In the step 178, SP compares the newly hashed $MD\hat{}_{EC}$ 176 with the $MD_{EC}$ recovered by decrypting the DS from the original KE message. If there is any discrepancy found, the KE message has been corrupted and is therefore rejected 180. Otherwise, SP is ready to send a KE response message back to merchant and EC.

To format the KE response message for the EC, the SP generates a random number, $RN_{SP-EC}$ 184, and a session key $Skey_{EC}$ 186 for the EC, combines them with the EC generated random number, 188 $RN_{EC}$, service provider sensitive transaction data $STD_{SP-EC}$ 190 and encrypts them 192 using the EC's public key $PK_{EC}$. The resulting cryptogram, $E_{EC-PK}(RN_{EC}*RN_{SP-EC}*Skey_{EC}*STD_{SP-EC})$, is combined 196 with a transaction identification number, $TID_{SP-EC}$ 194 assigned to the EC by the SP and plain text, PLAIN $TEXT_{SP-EC}$ 195, if any, to form the data portion of the response message for the EC. The SP runs this data through a hash algorithm to calculate the message digest $MD_{SP-EC}$ 198. Using its own private key 202, the SP creates a digital signature $DS_{SP-Private-Key}$ 200 for the response message by digitally signing the message digest $MD_{SP-EC}$. After combining 204 the data portion of the message with the newly calculated $DS_{SP-Private-Key}$, the SP's KE response message for the EC is complete, $[TID_{SP-EC}*PLAIN\ TEXT_{SP-EC}*E_{EC-PK}(RN_{SP-EC}*RN_{EC}*Skey_{EC}*STD_{EC})]*DS_{SP-Private-Key}$.

Figure 8:
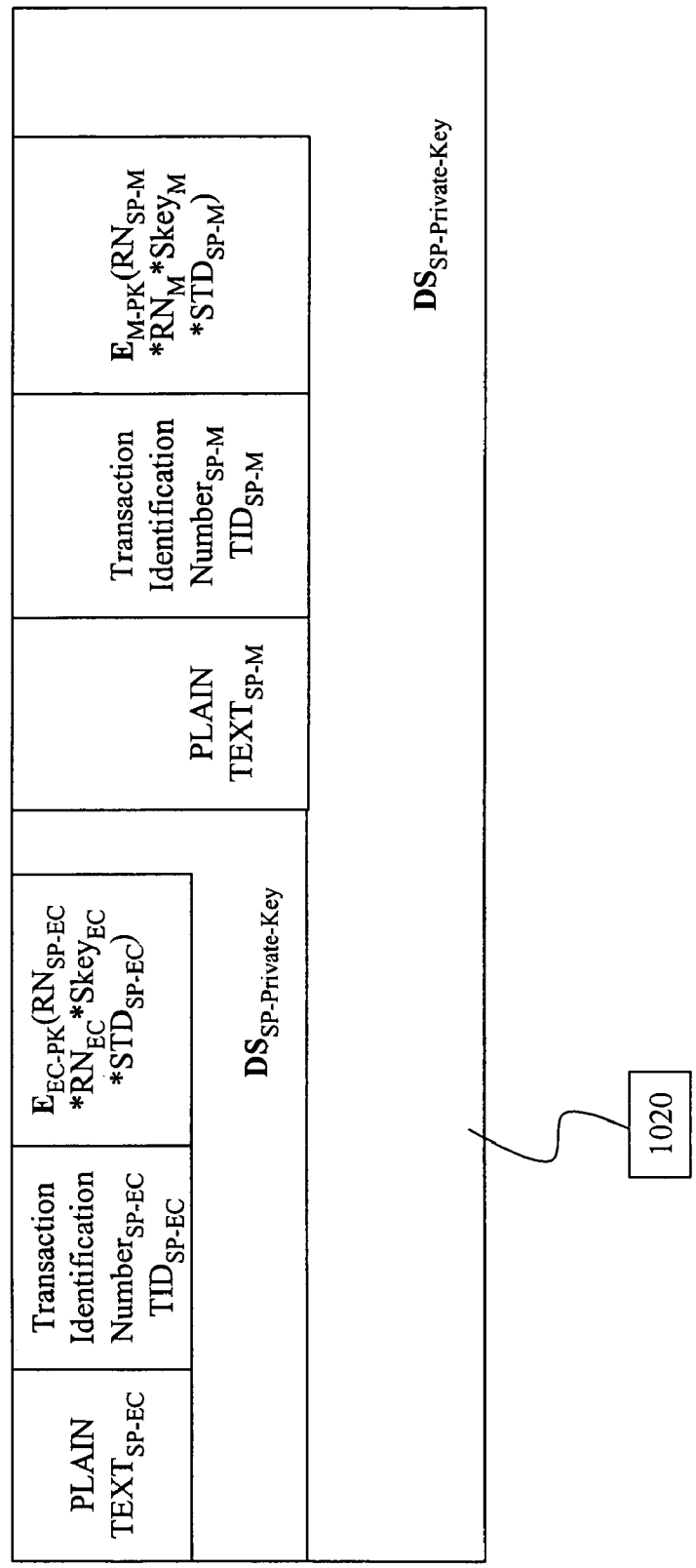

To format the KE response message for the merchant, the SP generates a random number $RN_{SP-M}$ 208 and a session key $Skey_M$ 210 for the merchant and combines them with the merchant generated random number $RN_M$ 212, sensitive transaction data $STD_{SP-EC}$ 214 and encrypts them 206 using the merchant's public key $PK_M$ recovered in 170. The resulting cryptogram is combined 216 with a transaction identification number, $TID_{SP-M}$ 218, assigned to the merchant by the SP and plain text, PLAIN $TEXT_{SP-M}$ 220, if any, to form the data portion of the response message for merchant. The resulting combination message, $TID_{SP-M}*PLAIN TEXT_{SP-M}*E_{M-PK}(RN_{SP-M}*RN_M*Skey_M*STD_{SP-M})$ is further combined 222 with the KE response message for the EC, $[TID_{SP-EC}*PLAIN TEXT_{SP-EC}*E_{EC-PK}(RN_{SP-EC}*RN_{EC}*Skey_{EC}*STD_{EC})]*DS_{SP-Private-Key}$, to form the data portion of the SP's final KE response message, $[TID_{SP-EC}*PLAIN TEXT_{SP-EC}*E_{EC-PK}*(RN_{SP-EC}* RN_{EC}*Skey_{EC}*STD_{EC})]*DS_{SP-Private-Key}*[TID_{SP-M}*PLAIN TEXT_{SP-M} *E_{M-PK}(RN_{SP-M}*RN_M*Skey_M*STD_{SP-M})]$. The SP runs the data portion through a hash algorithm to calculate the message digest 224. Using its own private key 228, the SP creates a digital signature, $DS_{SP-Private-Key}$ 226, for the response message by digitally signing the message digest. After combining 230 the data portion of the message with the newly calculated DS 226, the KE response message for both the EC and the merchant is complete. The response message $<<\{[TID_{SP-EC}*PLAIN TEXT_{SP-EC}*(E_{EC-PK}*RN_{SP-EC}*RN_{EC}*Skey_{EC}*STD_{SP-EC})]DS_{SP-Private-Key}\}*[TID_{SP-M}*PLAIN TEXT_{SP-M}*E_{M-PK}(RN_{SP-M}*RN_M*Skey_M*STD_{SP-M})]>>DS_{SP-Private-Key}$ is sent back to the merchant through a network. FIG. 8 depicts the final format and content of the combined KE response message from the SP to the merchant.

When the merchant receives the KE response message 232, the merchant first separates the $DS_{SP-Private-Key}$, which was signed by the SP, and then feeds the data portion of the combined KE response message into a one-way hash algorithm to recalculate the message digest $MD^\wedge_{SP-M}$. The merchant then separates the data portion of the SP's KE response message, i.e., $TID_{SP-M}$, PLAIN $TEXT_{SP-M}$, $CRYPTO_{SP-M}$, $[(TID_{SP-EC}*PLAIN TEXT_{SP-EC}*CRYPTO_{SP-EC})]*DS_{SP-Private-Key}$. The merchant uses SP's public key (selected from 144) to decrypt the digital signature $DS_{SP-Private-Key}$ to recover the message digest $MD_{SP-M}$. The merchant compares 234 the newly hashed $MD^\wedge_{SP-M}$ with the $MD_{SP-M}$. If there is any discrepancy between $MD^\wedge_{SP-M}$ and $MD_{SP-M}$, the KE response message has been corrupted and is therefore rejected 236. If $MD^\wedge_{SP-M}$ and $MD_{SP-M}$ match, then the merchant identifies the part of the response message which is meant for him and decrypts the cryptogram $CRYPTO_{SP-M}$ 238 using his own private key. The merchant should be able to recover the original random number $RN_M$ (of 148) that he sent to the SP in the KE request message. The merchant compares 240 the recovered random number $RN_M$ (of the step 238) with the original random number $RN_M$. If they are not equal, then the message has been corrupted and the message is rejected 242. Since the random number $RN_M$ can only be recovered by the SP using the correct SP private key, it is assured that the sender of the message is indeed the selected SP. The merchant then forwards the EC's KE response message $[(TID_{SP-EC}*PLAIN TEXT_{SP-EC}*CRYPTO_{SP-EC})]*D_{SP-Private-Key}$ to the EC and prepares for the transaction phase of the transaction.

When the EC receives the KE response message 260, the EC first separates the $DS_{SP-Private-Key}$, which was signed by the SP, and then feeds the data portion of the KE response message for the EC into a one-way hash algorithm producing a $MD^\wedge_{SP-EC}$. The EC then separates the data portion of the message, i.e., $TID_{SP-EC}$, PLAIN $TEXT_{SP-EC}$, $CRYPTO_{SP-EC}$, $DS_{SP-Private-key}$. The EC uses SP's public key (selected in 120) to decrypt the digital signature $DS_{SP-Private-key}$ message and recovers the message digest $MD_{SP-EC}$. The EC compares 262 the newly hashed $MD^\wedge_{SP-EC}$ (in 260) with the $MD_{SP-EC}$ recovered by decrypting the $DS_{SP-Private-key}$ from the KE response message for EC. If there is any discrepancy between $MD^\wedge_{SP-EC}$ and $MD_{SP-EC}$ found, the KE response message for the EC has been corrupted and is therefore rejected 264. If $MD^\wedge_{SP-EC}$ and $MD_{SP-EC}$ match, the EC identifies the part of the response message which is meant for him and decrypts 266 the cryptogram $CRYPTO_{SP-EC}$, which is contained in the message, using his own private key. The EC should be able to recover the original random number $RN_{EC}$ (of 124) that was sent in the EC KE request message. The EC compares 268 the recovered random number $RN_{EC}$ (of 266) with the original random number $RN_{EC}$ (of 124). If the random numbers are not equal, then the message has been corrupted and the message is rejected 270. Since only the SP using the correct SP private key can recover the random number $RN_{EC}$, this serves to ensure that the sender of the message is indeed the selected SP. The EC prepares for the transaction phase of the transaction.

There will be a predefined timeout period set in the EC and the merchant. During a transaction, if a response message is not received within a timeout period, the EC and the merchant will consider the transaction aborted and will either retry or start the recovery process.

After successful completion of the KE message exchanges, the SP has EC's public key and the merchant's public key. At this point, both the EC and the merchant has a random number, a transaction ID, and a session key from the SP. The EC and the merchant must send the two random numbers recovered from the KE response message back to the SP to complete the key exchange phase of the transaction. This can be done in two ways. The random numbers can be sent back through a confirmation message from both the EC and the merchant. Or the random numbers can be sent back as part of the next message going out from the EC and the merchant to the SP, such as a transaction message. The second method is simpler and is described in phase II below. The random numbers are used only once to ensure the correctness of the key exchange between the SP and merchant, and the SP and EC. Once the session keys and transaction identification number have been established, the random number are no longer be used.

Phase II: Transaction Phase

During the transaction phase, the merchant and the EC each sends their own account information such as an account number and other transaction related data such as transaction amount, request for approval or other processing, to the SP. Again, the EC and the merchant talk to the SP individually but through combined messages and the merchant is responsible for combining the messages and sending them as one message to the SP.

The EC first forms the transaction message by concatenating the random number $RN_{SP-EC}$ 274 from the SP and the EC's account information with the selected SP, $AI_{EC}$ 276, transaction amount TA 280 and any other sensitive data 278 relevant to the transaction and/or required by the SP. The EC encrypts 272 them using the session key $Skey_{EC}$ assigned by the SP. The $Skey_{EC}$ is a secret key and uses a cryptographic algorithm different from the cryptographic algorithm used for the public key encryption. The resulting cryptogram $CRYPTO_{EC}$, i.e., $Skey_{EC}(RN_{SP-EC}*STD_{EC}*AI_{EC}*TA)$, is then combined 282 with the transaction ID $TID_{SP-EC}$ 284 and the plain text PLAIN $TEXT_{EC}$ 286, if any, to form the data portion of the EC's transaction message, $TID_{SP-EC}*PLAIN TEXT_{EC}*CRYPTO_{EC}$. The data portion 282 is fed into a one-way hash algorithm 288 to calculate the message digest $MD_{EC}$ and the $MD_{EC}$ is then digitally signed 290 by the EC's private key 292. The resulting digital signature 290 is combined with the data portion of the message (from 282) 294 to form EC's transaction request message and then sent to the merchant, [$TID_{SP-EC}$*PLAIN TEXT$_{EC}$*Skey$_{EC}$ ($RN_{SP-EC}$*STD$_{EC}$*AI$_{EC}$*TA)]*DS$_{EC-Private-Key}$.

Figure 9:
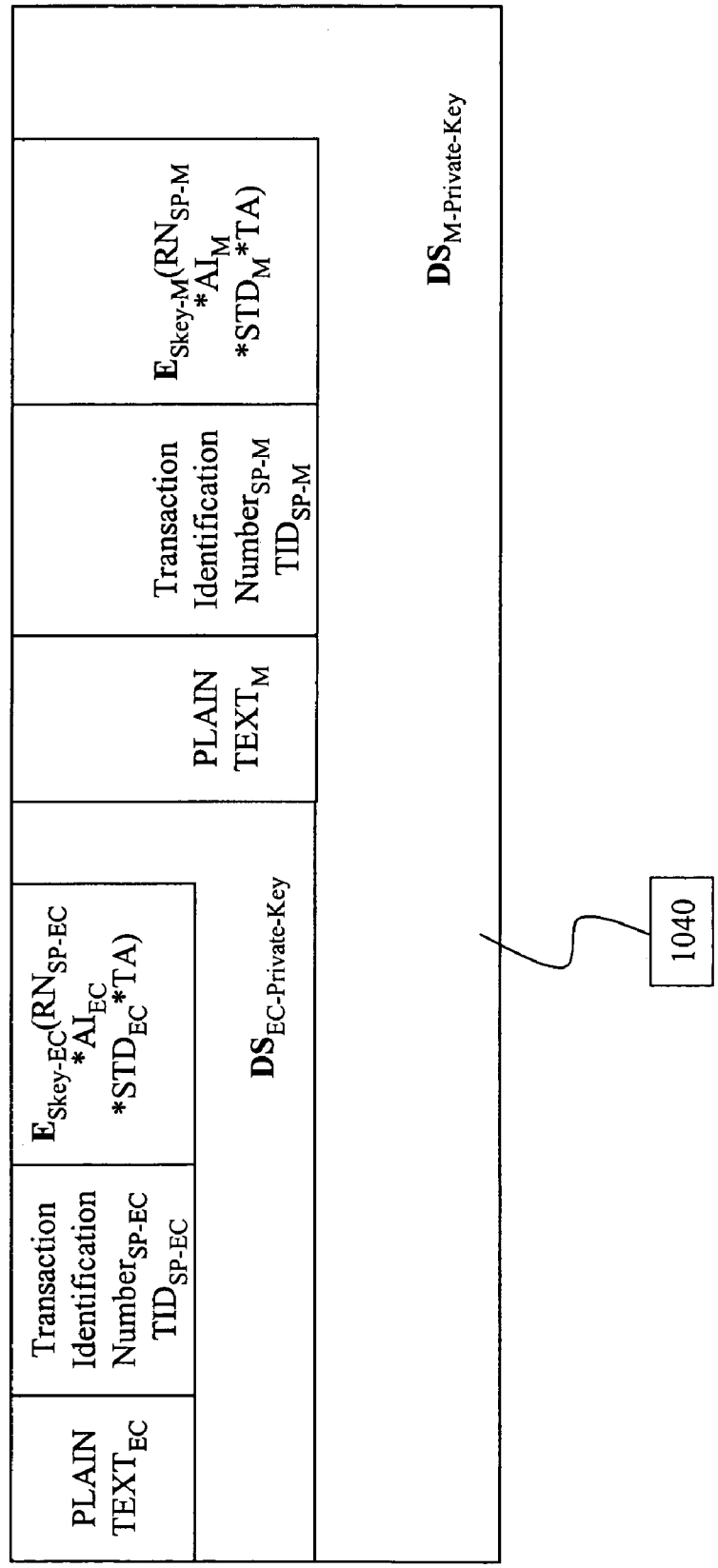

The merchant goes through essentially the same steps to form his transaction message. The merchant forms his transaction message by concatenating 246 the $RN_{SP-M}$ from the SP and the merchant's account information with the selected SP, $AI_M$ 248, transaction amount TA 252 and any other sensitive data $STD_M$ 250 relevant to the transaction and/or required by the SP. The merchant encrypts them 244 using the session key Skey$_M$ assigned by the SP. The session key Skey$_M$ is a secret key and is created using a different cryptographic algorithm, such as DES, from the cryptographic algorithm used for public key encryption. The session key Skey$_M$ is used to perform the encryption at this point to create the cryptogram CRYPTO$_M$. The resulting cryptogram CRYPTO$_M$, i.e., Skey$_M$($RN_{SP-M}$*STD$_M$*AI$_M$*TA), is then combined 254 with the transaction ID $TID_{SP-M}$ 256 and the plain text PLAIN TEXT$_M$ 258, if any, to form the data portion of the merchant's transaction message, $TID_{SP-M}$*PLAIN TEXT$_M$*CRYPTO$_M$. This data is combined 296 with the EC's transaction request to form the data portion of the final transaction request message for the SP, [$TID_{SP-EC}$* PLAIN TEXT$_{EC}$*Skey$_{EC}$($RN_{SP-EC}$*STD$_{EC}$*AI$_{EC}$*TA)]* DS$_{EC-Private-Key}$*[$TID_{SP-M}$ *PLAIN TEXT$_M$*Skey$_M$ ($RN_{SP-M}$*STD$_M$*AI$_M$*TA)]. As before, the merchant feeds his combined data through a one-way hash algorithm 298 to calculate the message digest MD$_M$ and the MD$_M$ is then digitally signed 300 by the merchant's private key 302. The resulting digital signature DS$_{M-Private-Key}$ 300 is combined 304 with the data portion of the message (from 296) to form the final transaction request message and is then sent to the SP, {[$TID_{SP-EC}$*PLAIN TEXT$_{EC}$*Skey$_{EC}$ ($RN_{SP-EC}$* STD$_{EC}$*AI$_{EC}$*TA)]*DS$_{EC-Private-Key}$*[$TID_{SP-M}$ *PLAIN TEXT$_M$*Skey$_M$($RN_{SP-M}$*STD$_M$*AI$_M$*TA)]}* DS$_{M-Private-Key}$. FIG. 9 depicts the final format of the transaction request message.

When the SP receives the transaction request message, the SP first checks 306 the two transaction identification numbers, i.e., $TID_{SP-EC}$ and $TID_{SP-M}$, sent by the EC and the merchant and makes sure they are valid. When either $TID_{SP-M}$ (of 218) or $TID_{SP-EC}$ (of 194) is found invalid 306, then the message is rejected 308. If the transaction identification numbers are both valid, then the SP proceeds to separate the DS$_{M-private-Key}$ from the data portion of the message and feeds the data portion of the message, {[$TID_{SP-EC}$ *PLAIN TEXT$_{EC}$*Skey$_{EC}$ ($RN_{SP-EC}$* STD$_{EC}$*AI$_{EC}$*TA)]*DS$_{EC-Private-Key}$*[$TID_{SP-M}$* PLAIN TEXT$_M$*Skey$_M$($RN_{SP-M}$*STD$_M$*AI$_M$*TA)]} into a one-way hash algorithm to calculate the message digest MD$^\wedge_M$ of this message. The SP separates the data portion of the message, i.e., $TID_{SP-M}$, PLAIN TEXT$_M$, CRYPTO$_M$, DS$_{M-Private-Key}$, ($TID_{SP-EC}$*PLAIN TEXT$_{EC}$*CRYPTO$_{EC}$) *DS$_{EC-Private-Key}$. The SP decrypts 310 the DS$_{M-Private-Key}$ using the merchant's public key and compares the newly recovered message digest MD$_M$ with the message digest just calculated MD$^\wedge_M$ (from 306). If MD$^\wedge_M$ and MD$_M$ are not equal, the message has been corrupted and is rejected 314. If MD$^\wedge_M$ and MD$_M$ match, then the SP decrypts 316 the encrypted portion of the message using the session key Skey$_M$ (of 210) it assigned to the merchant during the KE phase and recovers the data fields contained in the encrypted portion. The SP compares 318 the random number $RN_{SP-M}$ the merchant sends back in the message with the message the SP sent to the merchant originally, $RN_{SP-M}$ (from 208).

If the random numbers are not equal, then the merchant has failed the mutual authentication test and the message is rejected 320.

In addition, the SP will verify the EC's account information $AI_{EC}$ and the transaction data such as the transaction amount TA. The message is rejected 320 if the AI is no longer valid. It is also rejected when the TA from the EC and the TA from the merchant do not match. There may be other conditions for invalidating a message. If the account information $AI_{EC}$ and the transaction are valid, then the SP goes on to verify the EC portion of the message.

As with the merchant's message, the SP first separates 322 the DS$_{EC-Private-Key}$ from the EC's message and feeds the data portion of the EC's message, ($TID_{SP-EC}$*PLAIN TEXT$_{EC}$*CRYPTO$_{EC}$) into a one-way hash algorithm to calculate the message digest MD$^\wedge_{EC}$ of the EC message. The SP separates the data portion of EC's transaction request, $TID_{SP-EC}$, PLAIN TEXT$_{EC}$, CRYPTO$_{EC}$, DS$_{EC-Private-Key}$. The SP decrypts 324 DS$_{EC-Private-Key}$ using EC's public key PK$_{EC}$ and recovers MD$_{EC}$. The SP compares 326 the recovered MD$_{EC}$ with MD$^\wedge_{EC}$. If MD$^\wedge_{EC}$ and MD$_{EC}$ are not equal, the message has been corrupted and is rejected 328. If MD$^\wedge_{EC}$ and MD$_{EC}$ match, then the SP decrypts 330 the encrypted portion of the EC message using the session key Skey$_{EC}$ (of 186) it assigned to the EC during the KE phase and recovers the data fields contained in it. The SP compares 332 the random number $RN_{SP-EC}$ the EC sends back in the message with the random number $RN_{SP-EC}$ it sent out to the EC originally (in 184). If the random numbers are not equal, then the EC has failed the mutual authentication test and the message is rejected 334. The SP will verify the merchant's account information $AI_M$ and the transaction data such as the transaction amount TA and will reject the message when the account information is invalid or when the transaction data does not meet the SP's criterion 334. Once the integrity and authenticity of the overall message has been established, the SP can process the data contained in the message and send a response message back. The random number that is sent back in this message completes the mutual authentication between the SP and the merchant, and between the SP and the EC. After this message, no exchange of random numbers will be necessary. The SP can chooses to use the random number as the transaction identification number which the merchant and the EC will use in all subsequent messages that they send to the SP.

As before, the response message contains information for both the EC and the merchant. To format the transaction response message for the EC, the SP generates the response data for the EC, Response Data$_{SP-EC}$ 338, and encrypts 336 it using the session key Skey$_{EC}$ assigned to the EC. Only sensitive data is encrypted. Non-sensitive response data is included in the plain text. The cryptogram CRYPTO$_{SP-EC}$, i.e., E$_{Skey-EC}$(Response Data$_{SP-EC}$), is combined 340 with the transaction identification number $TID_{SP-EC}$ 342 that the SP assigned to the EC (from 194) and the plain text that the SP has for EC 344, if any, to form the data portion of the response message for the EC, i.e., $TID_{SP-EC}$*PLAIN TEXT$_{SP-EC}$*E$_{Skey-EC}$(Response Data$_{SP-EC}$). The data portion of the message is fed into a hash algorithm 346 to generate a MD$_{SP-EC}$ which is digitally signed 348 by the SP using the SP's private key 350. The DS$_{SP-Private-Key}$ is combined 352 with the data portion of the response message (from 340) to form the complete response message for the EC, [$TID_{SP-EC}$*PLAIN TEXT$_{SP-EC}$*E$_{Skey-EC}$(Response Data$_{SP-EC}$)]*DS$_{SP-Private-Key}$. To format the transaction response message for the merchant, the SP generates the response data for the merchant, Response Data$_{SP-M}$ 356, and encrypts 354 it using the session key $Skey_M$ assigned to the merchant (from 210). The cryptogram $CRYPTO_{SP-M}$, is combined 358 with the transaction identification number $TID_{SP-M}$ assigned to merchant 360 (from 218) and the plain text $PLAIN\ TEXT_{SP-M}$ that the SP has for merchant 362, if any, to form the data portion of the response message for the merchant, $TID_{SP-M}*PLAIN\ TEXT_{SP-M}*CRYPTO_{SP-M}$. The data is then combined 364 with the completed response message for the EC to form the data portion of the response message for both the EC and the merchant, $[(TID_{SP-EC}*PLAIN\ TEXT_{SP-EC}*E_{Skey-EC}(Response\ Data_{SP-EC})]*DS_{SP-Private-Key}*[TID_{SP-M}*PLAIN\ TEXT_{SP-M}*E_{Skey-M}(Response\ Data_{SP-M})]$.

Figure 10:
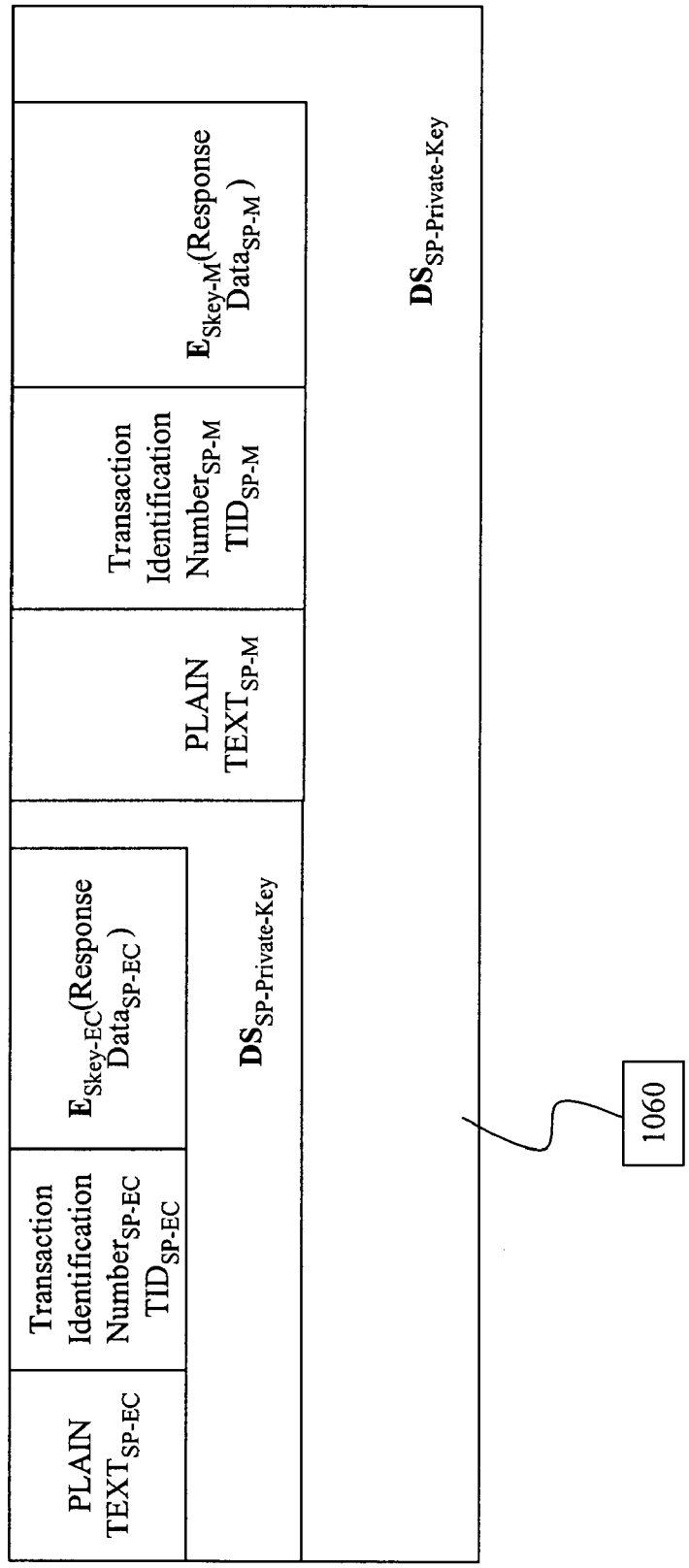

The data is then fed into a hash algorithm 366 to generate a $MD_{SP-M}$ which is digitally signed 368 by the SP using the SP's private key 370. The $DS_{SP-Private-Key}$ is combined 372 with the data portion of the response message for both the EC and the merchant to form the complete response message for both the EC and the merchant, $<<\{[TID_{SP-EC}*PLAIN\ TEXT_{SP-EC}*E_{Skey-EC}(Response\ Data_{SP-EC})]*DS_{SP-Private-Key}\}*[TID_{SP-M}*PLAIN\ TEXT_{SP-M}*E_{Skey-M}(Response\ Data_{SP-M})]>>*DS_{SP-Private-Key}$. The SP then sends its response message back to the merchant. FIG. 10 depicts the final format of the transaction response message.

When the merchant receives the message, the merchant first checks 374 the transaction identification number, $TID_{SP-M}$, in the message and makes sure it is valid. If the transaction identification number is invalid then the message is rejected 376. If the $TID_{SP-M}$ is valid, then the merchant separates the $DS_{SP-Private-Key}$ which was signed by the SP from the data portion of the message, and then feeds the data portion of the transaction response message $<<\{[TID_{SP-EC}*PLAIN\ TEXT_{SP-EC}*E_{Skey-EC}(Response\ Data_{SP-EC})]*DS_{SP-Private-Key}\}*[TID_{SP-M}*PLAIN\ TEXT_{SP-M}*E_{Skey-M}(Response\ Data_{SP-M})]>>$ into a one-way hash algorithm producing a $MD\hat{}_{SP-M}$. The merchant separates the data portion of the message into different parts, $TID_{SP-M}$, $PLAIN\ TEXT_{SP-M}$, $CRYPTO_{SP-M}$, $DS_{SP-Private-Key}$ ($TID_{SP-EC}*PLAIN\ TEXT_{SP-EC}*CRYPTO_{SP-EC}*DS_{SP-Private-Key}$) and prepares to forward SP's transaction response message to the EC. The merchant decrypts 378 the encrypted portion of the SP's message using the session key $Skey_M$ assigned by the SP during the KE phase and recovers the data fields contained within it. The merchant then uses SP's public key, $PK_{SP}$ (from 144), to decrypt the digital signature $DS_{SP-Private-Key}$ to recover $MD_{SP-M}$. The merchant compares 380 the newly hashed $MD\hat{}_{SP-M}$ (from 374) with the recovered $MD_{SP-M}$. If $MD\hat{}_{SP-M}$ and $MD_{SP-M}$ do not match, then the transaction response message has been corrupted and is therefore rejected 382. If the message digests match, then the merchant starts processing the message. As usual, the EC portion of the transaction response message ($TID_{SP-EC}*PLAIN\ TEXT_{SP-EC}*CRYPTO_{SP-EC}*DS_{SP-Private-Key}$) is passed to EC.

When the EC receives the transaction response message, the EC first checks 394 the transaction identification number, $TID_{SP-EC}$, in the message and makes sure it is valid. If the transaction identification numbers is invalid, then the message is rejected 396. If the transaction identification number is valid, then the merchant separates the $DS_{SP-Private-Key}$ which was signed by the SP, from the data portion of the transaction response message, and then feeds the data portion of the EC transaction response message $TID_{SP-EC}*PLAIN\ TEXT_{SP-EC}*E_{Skey-EC}(Response\ Data_{SP-EC})$ into a one-way hash algorithm producing $MD\hat{}_{SP-EC}$. The EC separates the message into different parts, $TID_{SP-EC}$, $PLAINT_{SP-EC}$, $CRYPTO_{SP-EC}$, $DS_{SP-Private-Key}$. The EC decrypts 398 the encrypted portion of SP's message using the session key Skey assigned by the SP during the KE phase and recovers the data fields contained within it. The EC uses SP's public key (from 120) to decrypt the digital signature $DS_{SP-Private-Key}$ and recovers the message digest $MD_{SP-EC}$. The merchant compares 400 the newly hashed $MD\hat{}_{SP-EC}$ 394 with the recovered $MD_{SP-EC}$. If $MD\hat{}_{SP-EC}$ and $MD_{SP-EC}$ do not match, then the transaction response message has been corrupted and is therefore rejected 402. If the message digests match, then the EC starts processing the message.

At the end of the transaction, the EC and the merchant can, if required by the SP, send an acknowledgement message to the SP to signal that the response message has been correctly received and processed. This acknowledgement data can be included as a part of the next message to be sent to the SP, if there are more messages to be exchanged between the SP and the merchant and the EC before the transaction ends. Or the acknowledgement data can be a message by itself.

To format the acknowledgement message, the EC first encrypts 404 the sensitive part of the acknowledgement data, $Acknowledgement\ Data_{EC}$, 406, if any, using the session key, $Skey_{EC}$, thus creating $Skey_{EC}(Acknowledgement\ Data_{EC})$. The EC combines 408 the resulting cryptogram with the transaction identification number $TID_{SP-EC}$ 410 assigned by the SP and the plain text $PLAIN\ TEXT_{EC}$ 412, if any. This forms the data portion of EC's acknowledgement message, $TID_{SP-EC}*PLAIN\ TEXT_{EC}*Skey_{EC}(Acknowledgement\ Data_{EC})$. This combined data is then fed into a one-way hash algorithm 414 to generate the $MD_{EC}$. The resulting $MD_{EC}$ is then digitally signed 416 by the EC using the EC's private key 418 to generate a $DS_{EC-Private-Key}$. The $DS_{EC-Private-Key}$ is combined 420 with the data portion of the message (from 408) to form the complete acknowledgement message for the EC, $[TID_{SP-EC}*PLAIN\ TEXT_{EC}*Skey_{EC}(Acknowledgement\ Data_{EC})]*DS_{EC-Private-Key}$. The acknowledgement message is then sent to the merchant.

Figure 11:
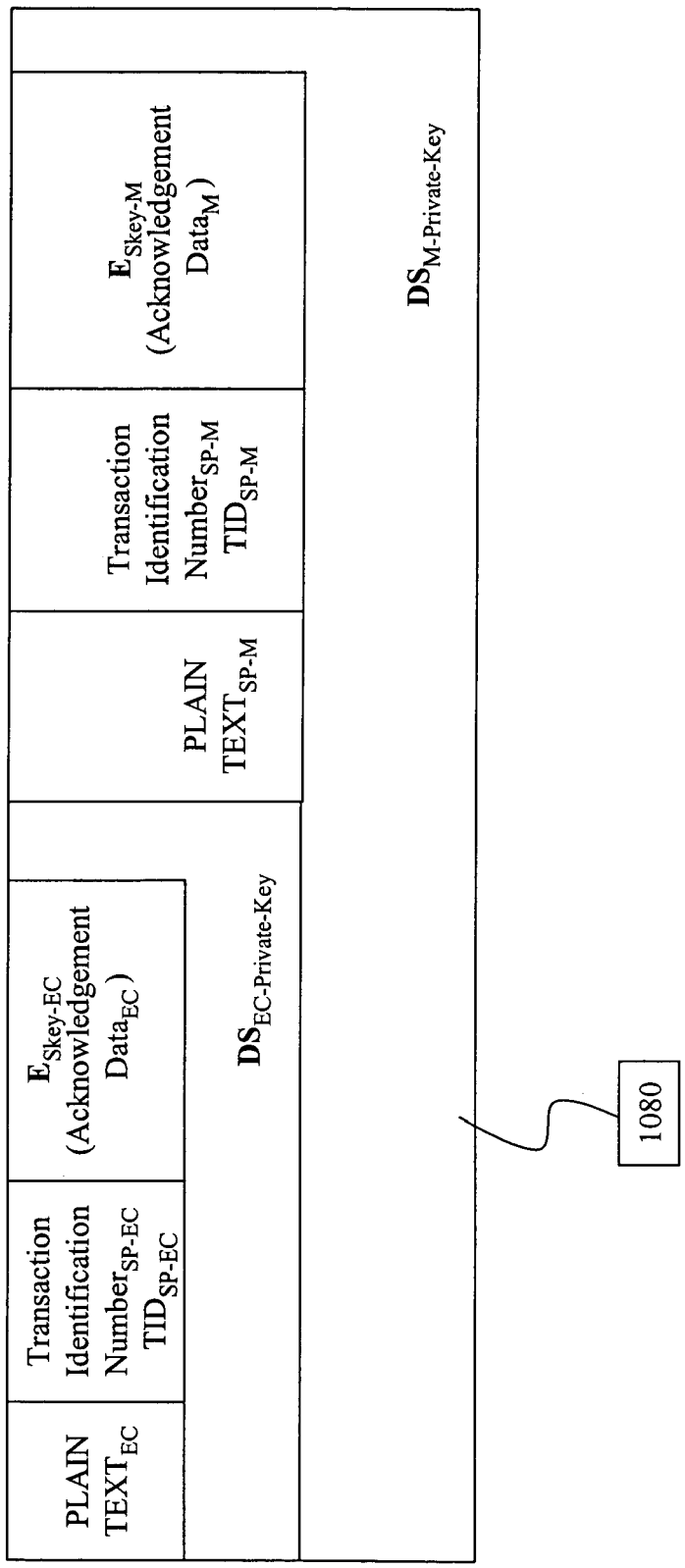

The merchant goes through the same steps to form his own acknowledgement message. To format the acknowledgement message, the merchant first encrypts the sensitive parts of the acknowledgement data, $Acknowledgement\ Data_M$ 386, if any using the session key $Skey_M$ assigned by the SP to merchant, thus creating $Skey_M(RN_{SP-M}*Acknowledgement\ Data_M)$. The merchant combines 388 the resulting cryptogram with the transaction identification number $TID_{SP-M}$ 390 assigned by the SP, and the plain text $PLAIN\ TEXT_M$ (from 392), if any. This forms the data portion of the merchant's acknowledgement message, $TID_{SP-M}*PLAIN\ TEXT_M*Skey_M(RN_{SP-M}*Acknowledgement\ Data_M)$. This data portion is further combined 422 with the acknowledgement message received from the EC to form the data portion of the combined acknowledgement message for the SP, $\{[TID_{SP-EC}*PLAIN\ TEXT_{EC}*Skey_{EC}(Acknowledgement\ Data_{EC})]*DS_{EC-Private-Key}\}*[TID_{SP-M}*PLAIN\ TEXT_M*Skey_M(Acknowledgement\ Data_M)]$. The merchant feeds the data portion of the combined acknowledgement message for the SP into a one-way hash algorithm to generate the message digest $MD_M$. The resulting $MD_M$ is then digitally signed by the merchant using the merchant's private key 428 to generate $DS_{M-Private-Key}$, 426. The $DS_{M-Private-Key}$ is combined 430 with the data portion of the message (from 422) to form the final combined acknowledgement message of the EC and the merchant designated for the SP, $<<\{[TID_{SP-EC}*PLAIN\ TEXT_{EC}*Skey_{EC}(Ac-$ knowledgement Data$_{EC}$)]*DS$_{EC\text{-}Private\text{-}Key}$}*[TID$_{SP\text{-}M}$*PLAIN TEXT$_M$ *Skey$_M$(Acknowledgement Data$_M$)]>>*DS$_{M\text{-}Private\ Key}$. This message is then sent to the SP. FIG. 11 depicts the final format of the transaction acknowledgement message.

TID$_{SP\text{-}M}$ is the transaction identification number assigned by the SP to the merchant (from 218) and TID$_{SP\text{-}EC}$ is the transaction identification number assigned by the SP to the EC (from 194). Upon receiving the transaction acknowledgement message, the SP checks 432 the two transaction identification numbers, TID$_{SP\text{-}M}$ and TID$_{SP\text{-}EC}$, sent by the EC and the merchant and makes sure they ate valid. When either TID$_{SP\text{-}M}$ or TID$_{SP\text{-}EC}$ is found invalid, then the message is rejected 434. If the transaction identification numbers are both valid, then the SP proceeds to separate the DS$_{M\text{-}Private\text{-}Key}$ from the combined acknowledgement message and feeds the data portion of the combined acknowledgement message <<{[TID$_{SP\text{-}EC}$*PLAIN TEXT$_{EC}$*Skey$_{EC}$(Acknowledgement Data$_{EC}$)]* DS$_{EC\text{-}Private\text{-}Key}$}*[TID$_{SP\text{-}M}$*PLAIN TEXT$_M$*Skey$_M$(Acknowledgement Data$_M$)]>> into a one-way hash algorithm to calculate the message digest MD$^\wedge_M$ of this message. The SP separates the data portion of the message, TID$_{SP\text{-}M}$, PLAIN TEXT$_M$, CRYPTO$_M$, DS$_{M\text{-}Private\text{-}Key}$, (TID$_{SP\text{-}EC}$*PLAIN TEXT$_{EC}$*CRYPTO$_{EC}$)*DS$_{EC\text{-}Private\text{-}Key}$. The SP decrypts 436 the DS$_{M\text{-}Private\text{-}Key}$ using the merchant's public key PK$_M$ and compares the recovered message digest MD$_M$ 432 with the message digest just calculated MD$^\wedge_M$ 436. If MD$^\wedge_M$ and MD$_M$ are not equal, then the message has been corrupted and is rejected 440. If MD$^\wedge_M$ and MD$_M$ match, then the SP decrypts 442 the encrypted portion of the merchant's acknowledgement message using the session key Skey$_M$ (from 210) that it assigned to the merchant during the KE phase and recovers the acknowledgement data contained within it.

The SP separates 444 the DS$_{EC\text{-}Private\text{-}Key}$ from the EC's acknowledgement message and feeds the data portion of the EC's acknowledgement message, TID$_{SP\text{-}EC}$*PLAIN TEXT$_{EC}$*CRYPTO$_{EC}$, into a one-way hash algorithm to calculate the message digest MD$^\wedge_{EC}$ of this message. The SP separates the data portion of the EC's acknowledgement message, TID$_{SP\text{-}EC}$, PLAIN TEXT$_{EC}$, CRYPTO$_{EC}$, DS$_{EC\text{-}Private\text{-}Key}$. The SP decrypts 446 the DS$_{EC\text{-}Private\text{-}Key}$ using the EC's public key PK$_{EC}$ and compares 448 the recovered MD$_{EC}$ with the message digest just calculated MD$^\wedge_{EC}$ 444. If the message digests are not equal, then the message has been corrupted and is rejected 450. If MD$^\wedge_{EC}$ and MD$_{EC}$ match, then the SP decrypts 452 the encrypted portion of the message using the session key Skey$_{EC}$ (from 186) that it assigned to the EC during the KE phase and recovers the acknowledgement data contained within it. This completes the processing of the transaction phase of the transaction 454.

Throughout the transaction, in a preferred embodiment, the EC works with interface software provided by Internet browser software such as the Microsoft Explorer or Netscape Navigator. In a typical session, the cardholder points his browser to the merchant's URL and orders goods or services from the merchant. At the time of payment, the browser will invoke the EC interface software, which can be built into the browser or included as a plug-in or add-on software component, and allow the transaction to proceed. The cardholder can point his browser to the URL of any SP member.

The two-phased transaction described in FIGS. 6A–6Q above is just a specific case of applying the two-phased key-exchange-transaction model. In the two-phased transaction described in FIGS. 6A–6Q, the number of parties involved in the transaction is three: the EC, the merchant and the SP. The two-phased key-exchange-transaction model is similarly applicable to cases where the number of parties involved varies from two to many. In a transaction that involves more than three parties, there is only one party that plays the role of the SP. All other parties use the public key of the selected SP to perform the initial key exchange and use session keys and transaction Ids assigned by the SP to carry out the transaction.

The two-phased key-exchange-transaction model is applicable to organization schemes wherein: (1) the participants can be arranged with possible routers in series with the service provider; or (2) the participants can be arranged with possible routers in a hierarchical organization. These additional organization schemes may involve routers, which route messages to the next level. A level of a hierarchy may be composed of any number of participants and/or routers. The next level is the next participant or router that is next in the sequence or hierarchy. In a hierarchical organization scheme, the next level includes all possible next participants and routers. For the hierarchical organization scheme, the SP establishes the criterion for determining the next participant or router to which a message is sent.

A router is a gateway/conduit, which collects the messages from a previous level and performs some processing on the messages according to an SP's requirements such as combining them, and then forwards the messages to the SP. Each participant need only form his own message (data and digital signature) and send it to the next level. A participant combines all the messages he receives with his own message and digitally signs the combined message before sending it to next level. In the hierarchical organization's simplest form, there is only one message router, which collects messages from all the other participants and sends the combined message to the SP.

Figure 12:
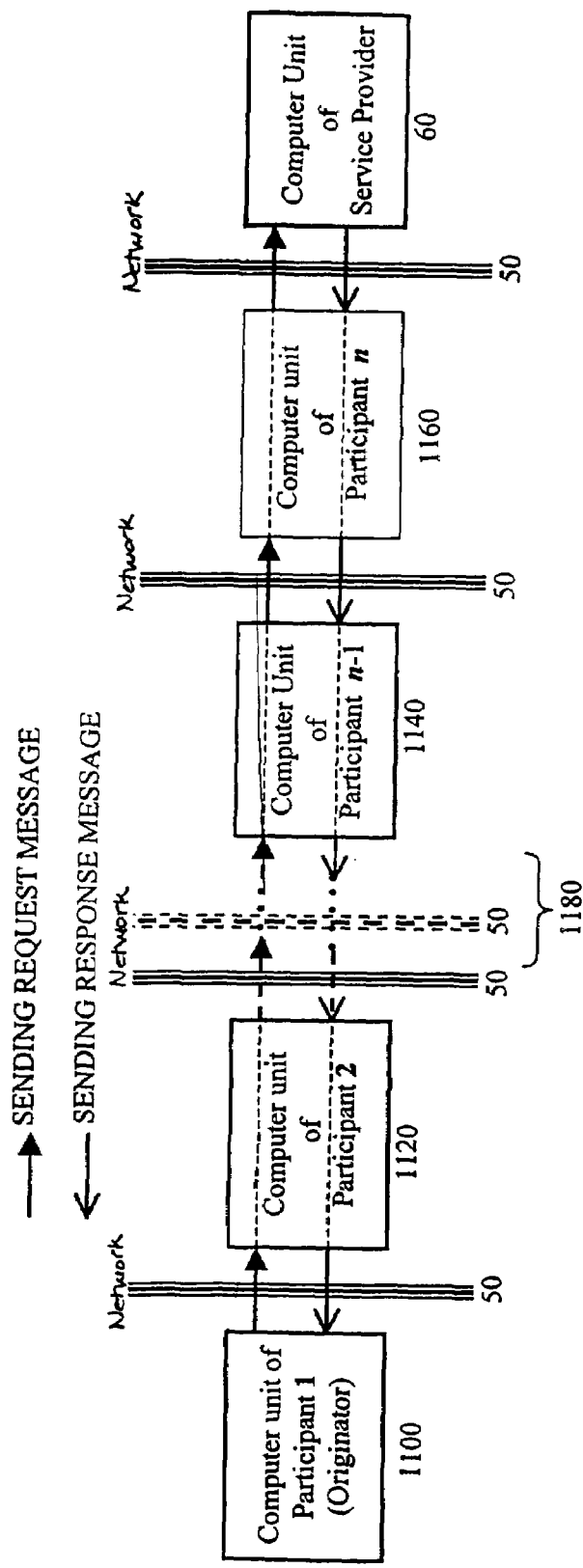
FIG. 12 shows a service provider conducting a transaction with participants that have been arranged in series.

In the series organization, an originator of a transaction is in series with routers and/or participants who in turn are in series with a service a service provider 60. In the preferred embodiment of the invention, each element shown in FIG. 12 is a participant. In an alternative embodiment of the invention, any intermediate element between the originator and the SP can be a router.

An originator conducts a transaction with participants 1100, 1120, 1140 and 1160 and a service provider that have been arranged in series as shown in FIG. 12. This is similar to the three-party scenario described in FIGS. 6A–6Q except for the fact that now there is more parties involved. Note participants 3, 4, 5, 6 . . . n–2 that have been arranged in series 1180. Each of the participants prepares his own message, incorporates it with the message he receives from a prior participant, if any, appends a digital signature with the message, and then sends it to the next participant in the line. The combined message is eventually sent to the SP and the SP forms the response message accordingly and sends it back through the same path the original request message has traveled.

Figure 13:
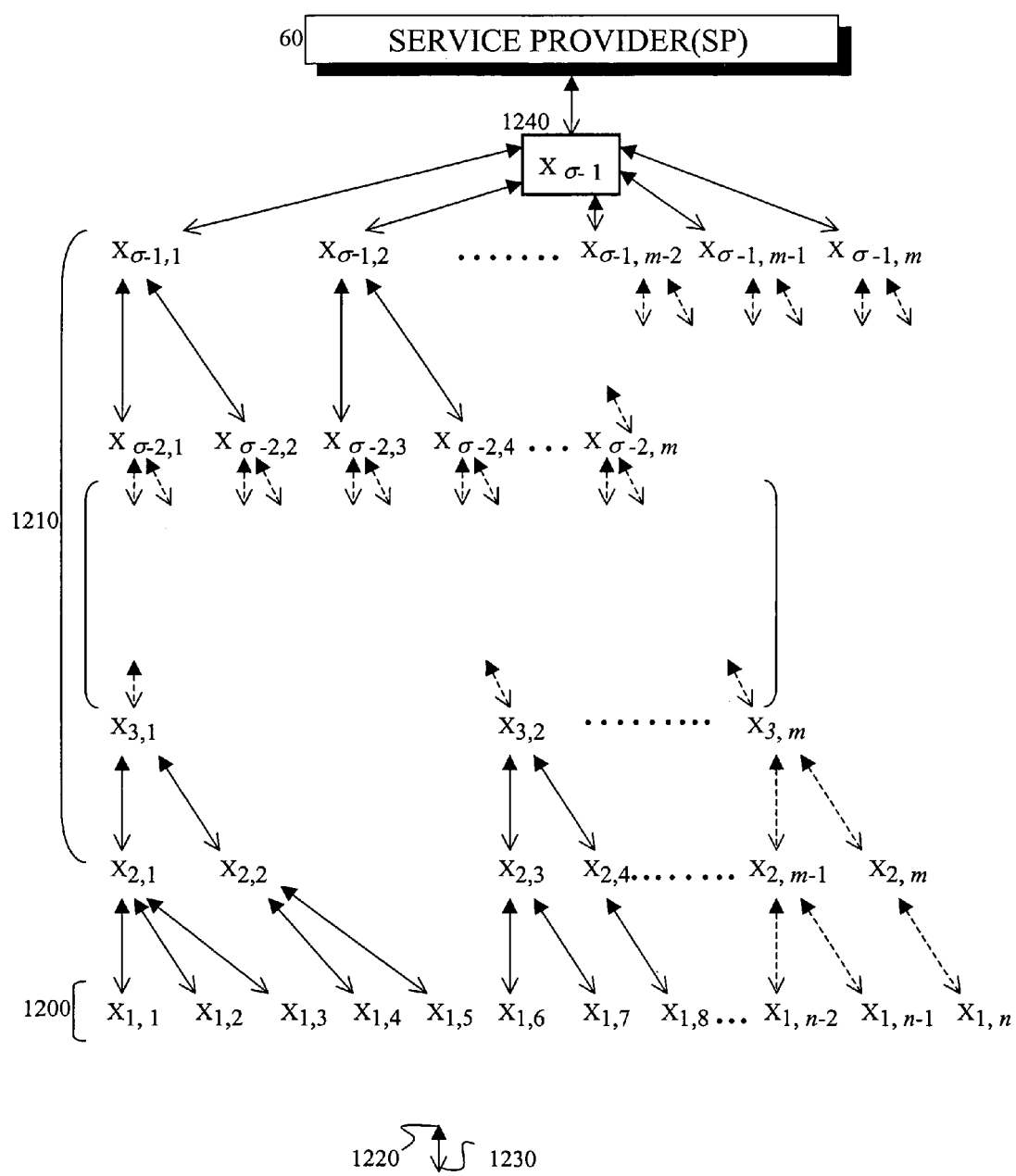
FIG. 13 shows a service provider transaction on a network with participants that have been arranged in a hierarchical organization scheme.

FIG. 13 shows elements arranged in a hierarchical organization scheme, where each element, X$_{l,1}$ to X$_{l,n}$ (n=1, 2, 3, . . . ) 1200, is a participant of the transaction and not a message router, and each element, X$_{j,k}$ (j=2, 3, 4, . . . ; k=1, 2, 3, . . . m; m is a variable of type n; m may be a different value for different levels of a hierarchy) 1210, can either be a participant or a router. The upward pointing bold arrow represents sending a request message 1220. The downward pointing arrow represents sending a response message 1230.

Each participant collects messages from a number of participants he is responsible for and, after combining the messages with his own and forming a new message, sends the new message to the next level. A hierarchical organization scheme may include only one participant to as many as is required (The most regressive case of the hierarchical scheme is one participant and one service provider). Eventually, at the last element before the service provider, $X_{o,1}$ where σ is of type n, all messages are combined into one message 1240, which is then sent to the SP 60. Again, the SP forms the response message and sends it back through the same route.

In the case when the SP is not directing the transaction, the members are conducting the transaction among themselves using the session key generated by the SP. A transaction can occur between two or more members. When there are more than two members involved in the transaction, the messages can flow from member to member in any order. A member sends a transaction request message and receives a transaction response message. A member does not necessarily have to receive a transaction response message from the same member that he sent the transaction request message. For example, three members in a transaction can be organized in a ring and send messages around the ring. A first member can send a transaction request message to a second member who in turn sends a transaction request message and a transaction response message to third member. The third member sends a transaction request message and a transaction response message to the first member, and the first member sends a transaction response message to a second member. A member receiving a transaction request message creates a transaction response message, which eventually will be sent to the member who sent the transaction request message.

During the key exchange phase, the SP obtains the public keys of all the transaction participating members. The SP sends to each participating member, the other members' public keys prior to the participating members conducting a transaction among them. The transaction request messages and the transaction response message include plain text, if any, a cryptogram, and a digital signature of the sending party.

In the case when the SP needs to act as the surrogate-certificate for the EC and/or the merchant in order to deal with a certificate-based external system, the SP shields the EC and/or the merchant from the operation of the external interface. The SP only returns to the EC and/or the merchant, the information needed to complete the transaction with the EC and/or the merchant.

While there have been described herein what are considered to be preferred and exemplary embodiments of the present invention, other modifications of the invention shall be apparent to those with ordinary skill in the art. Therefore, it is desired to be secured in the appended claims all such modifications and extensions as fall with within the true spirit and scope of the invention. The invention is to be construed as including all embodiments thereof that fall within the scope of the appended claims and the invention should only be limited by the appended claims below. In addition, one with ordinary skill in the art will readily appreciate that other applications may be substituted for those set forth herein without departing from the spirit and scope of the present invention.

What is claimed is:

1. A method of conducting an electronic transaction using an electronic card having a public key of a service provider, comprising:

formatting a key exchange request message at a member, the key exchange request message having a public key of the member, and at least a portion of the key exchange request message being encrypted using the service provider's public key from the electronic card;

sending the key exchange request message from the member to the service provider;

generating a session key exclusively at the service provider in response to the key exchange request message;

formatting a key exchange response message including the session key at the service provider;

sending the key exchange response message from the service provider to the member; and using the session key to complete the transaction.

2. The method of claim 1 wherein the key exchange request message further includes a member challenge for the service provider, and the key exchange response message further includes a response to the member challenge and a service provider challenge for the member, the method further comprising formatting by the member a response to the service provider challenge and sending it to the service provider.

3. The method of claim 1 or 2 wherein the use of the session key to complete the transaction comprises:

formatting by the member a transaction request message using the session key, the transaction request message including a digital signature of the member, and sending the transaction request message to the service provider; and formatting at the service provider, a transaction response message for the member using the session key, the transaction response including a digital signature of the service provider, and sending the transaction response message to the member.

4. The method of claim 3 wherein the transaction request message includes account information, transaction amount and transaction data, and wherein the formatting of the transaction request message by the member comprises encrypting with the session key the account information, the transaction amount and a portion of the transaction data.

5. The method of claim 3 wherein the transaction request message comprises plain text.

6. The method of claim 3 wherein the transaction request message comprises a transaction identification assigned to the member by the service provider.

7. The method of claim 3 wherein the transaction request message comprises the response to the service provider challenge.

8. The method of claim 3 wherein the transaction response message includes data encrypted with the session key.

9. The method of claim 3 wherein the transaction response message includes plain text.

10. The method of claim 3 wherein the transaction response message includes a transaction identifier assigned by the service provider to the member.

11. The method of claim 3 further comprising formatting at the member, using the session key, a transaction acknowledgment message, digitally signing by the member the transaction acknowledgment message, and sending the transaction acknowledgment message to the service provider.

12. The method of claim 11 wherein the transaction acknowledgement message includes data encrypted with the session key.

13. The method of claim 11 wherein the transaction acknowledgement message includes plain text.

14. The method of claim 11 wherein the transaction acknowledgement message includes a transaction identifier assigned to the member by the service provider.

15. A method of conducting an electronic transaction using an electronic card having a public key of a service provider, comprising:
  generating a member challenge by a member;
  encrypting by the member the member challenge using the service provider's public key from the electronic card to generate a first cryptogram;
  formatting by the member a key exchange request message including the first cryptogram and a public key of the member;
  signing digitally by the member the key exchange request message;
  sending the digitally signed key exchange request message from the member to the service provider;
  generating by the service provider a service provider challenge;
  generating exclusively by the service provider a session key;
  encrypting by the service provider the service provider challenge and the session key using the member's public key to generate a second cryptogram;
  formatting by the service provider a key exchange response message including the second cryptogram and a response to the member challenge;
  signing digitally by the service provider the key exchange response message;
  sending the digitally signed key exchange response message to the member;
  encrypting by the member a member response for the service provider challenge using the session key to generate a third cryptogram;
  attaching the third cryptogram to a transaction message going from the member to the service provider;
  signing digitally by the member the transaction message going from the member to the service provider; and
  sending the transaction message from the member to the service provider.

16. The method of claim 15 wherein the key exchange request message and key exchange response message each comprises plain text.

17. The method of claim 15 wherein the key exchange request message comprises the member's public key encrypted with the service provider's public key.

18. The method of claim 15 wherein the generation of the second cryptogram further comprises encrypting the member challenge response as part of the second cryptogram.

19. The method of claim 15 wherein the generation of the second cryptogram further comprises encrypting a transaction identifier as part of the second cryptogram.

20. The method of claim 15 wherein the key exchange response message further includes a transaction identifier comprising plain text.

21. The method of claim 20 further comprising using the transaction identifier with a second transaction message following the transaction message and going from the member to the service provider.

22. A method of communication using an electronic card having a public key of a service provider, comprising:
  formatting a first key exchange request message at a first member, the first key exchange request message having a public key of the first member, and at least a portion of the first key exchange request message being encrypted using the service provider's public key from the electronic card;
  sending the first key exchange request message from the first member to a second member;
  combining at a second member, a second member key exchange request message with the first member's key exchange request message and sending the combined key exchange request message, signed by the second member, to a service provider;
  generating a first session key exclusively by the service provider in response to the first key exchange request message;
  generating a second session key exclusively by the service provider in response to the second key exchange request message;
  formatting a key exchange response message at the service provider including a first session key for the first member, signing the response message, formatting a key exchange response message including the second session key for the second member, combining the key exchange response messages into a combined key exchange response message, signing the combined key exchange response message, and sending the combined key exchange response message to the second member; and
  separating at the second member, the key exchange response message for the second member from the key exchange response message for the first member, and forwarding the key exchange response message for the first member to the first member.

23. The method of claim 22 further comprising:
  formatting by the first member, using the first session key, a transaction request message, signing the transaction request message, and sending the transaction request message to the second member;
  formatting by the second member, using the second session key, a transaction request message;
  combining by the second member, the second member transaction request message with the first member transaction request message, signing the combined transaction request message, and sending the combined transaction request message to the service provider;
  formatting by the service provider, using the first session key, a transaction response message for the first member, and signing the transaction response message;
  formatting by the service provider, using the second session key, a transaction response message for the second member;
  combining the transaction response message for the first member with the transaction response message for the second member to form a combined transaction response message, and signing the combined transaction response message;
  sending the combined transaction response message to the second member;
  separating at the second member, the transaction response message for the first member from the transaction response message for the second member; and
  forwarding by the second member the transaction response message for the first member to the first member.

24. The method of claim 23 further comprising:
  formatting at the first member, using the first session key, an acknowledgment message, signing the acknowledgment message, and sending the acknowledgment message to a second member; and
  formatting at the second member, using the second session key, an acknowledgment message, combining the second member acknowledgment message with the first member acknowledgment message to form a combined acknowledgment message, signing the combined acknowledgment message, and sending the combined acknowledgment message to the service provider.

25. The method of claim 22 wherein the first session key is different from the second session key.

26. The method of claim 22 wherein the first session key is the same as the second session key.

27. The method of claim 22 wherein the key exchange response message for the second member includes the public key of the first member, and the key exchange response message for the first member includes the public key of the second member.

28. A method of communication using an electronic card having a public key of a service provider, comprising:

formatting a first key exchange request message at a first member, the first key exchange request message having a public key of the first member, and at least a portion of the first key exchange request message being encrypted using the service provider's public key from the electronic card;

sending the first key exchange request message from the first member to at least one intermediate member coupled in series between the first member and the service provider, each of said at least one intermediate member being either a message router or a participating member;

generating, if said at least one intermediate member comprises at least one participating member, at each of the participating members a key exchange request;

receiving at the service provider a combined key exchange request message from said at least one intermediate member, the combined key exchange request message comprising the first key exchange request message and the key exchange request message generated by each of the participating members;

generating exclusively by the service provider a first session key for the first member and a participating session key for each of the participating members;

formatting at the service provider a key exchange response message including each of the first and participating session keys;

sending the key exchange response message from the service provider to said at least one intermediate member;

separating by each participating member its respective participating session key from the key exchange response message; and sending the first session key from said at least one intermediate member to the first member.

29. The method of claim 28 further comprising:

encrypting a first transaction request message using the first session key at the first member;

sending the first transaction request message from the first member to said at least one intermediate member;

generating, if said at least one intermediate member comprises at least one participating member, at each of the participating members a transaction request message encrypted using its respective participating session key;

receiving at the service provider a combined transaction request message from said at least one intermediate member, the combined transaction request message comprising the first transaction request message and the transaction request message for each of the participating members;

formatting at the service provider a combined transaction response message comprising a transaction response message for the first member and each of the participating members;

sending the combined transaction response message from the service provider to said at least one intermediate member;

separating by each participating member its respective transaction response message from the combined transaction response message; and sending the transaction response message for the first member from said at least one intermediate member to the first member.

30. The method of claim 28 wherein the first session key and the participating session keys are each different from one another.

31. The method of claim 28 wherein the first session key and the participating session keys are the same as each other.

32. A method of communication using an electronic card having a public key of a service provider, comprising:

formatting a key exchange request message at each of a plurality of first members, the key exchange request message for one of the first members having a public key of said one of the first members, and at least a portion of the key exchange request message for said one of the first members being encrypted using the service provider's public key from the electronic card;

sending from each of the first members its respective key exchange request message to a second member, the second member being either a message router or a participating member;

generating, if the second member is a participating member, a second key exchange request message at the second member;

combining at the second member the key exchange request message from each of the first members to form a combined key exchange request message, the combined key exchange request message further comprising the second key exchange request message if the second member is a participating member;

receiving at the service provider the combined key exchange request message from the second member;

generating exclusively by the service provider a first session key for each of the first members, and a second session key for the second member if the second member is a participating member;

formatting at the service provider a key exchange response message including each of the first and second session keys;

sending the key exchange response message from the service provider to the second member;

separating by the second member the second session key from the key exchange response message if the second member is a participating member;

separating by the second member the first session key for each of the first members from the key exchange response message; and sending each of the first session keys to its respective first member.

33. The method of claim 32 further comprising:

encrypting a transaction request message at each of the first members using their respective first session keys;

sending from each of the first members its respective transaction request message to the second member;

generating, if the second member is a participating member, a second transaction request message at the second member and encrypting the second transaction request message with the second session key;

combining at the second member the transaction request message from each of the first members to form a combined transaction request message, the combined transaction request message further comprising the second transaction request message if the second member is a participating member;

receiving at the service provider the combined transaction request message from the second member;

generating at the service provider a transaction response message for each of the first members, and the second member if the second member is a participating member;

formatting at the service provider a combined transaction response message including the transaction response messages for each of the first members, and the second member if the second member is a participating member;

sending the combined transaction response message from the service provider to the second member;

separating by the second member its respective transaction response message from the combined transaction response message if the second member is a participating member;

separating by the second member the transaction response messages for each of the first members from the combined transaction response message; and sending each of the transaction response messages to its respective first member.

34. The method of claim 32 wherein the first session keys and the second session key are each different from one another.

35. The method of claim 32 wherein the first session keys and the second session key are the same as each other.

* * * * *